US012437659B2

(12) United States Patent
Shibata

(10) Patent No.: US 12,437,659 B2
(45) Date of Patent: Oct. 7, 2025

(54) AIRCRAFT AUTO LANDING SYSTEM

(71) Applicant: Yamaha Motor Corporation, USA, Cypress, CA (US)

(72) Inventor: Hideki Shibata, Cypress, CA (US)

(73) Assignee: Yamaha Motor Corporation, USA, Cypress, CA (US)

( * ) Notice: Subject to any disclaimer, the term of this patent is extended or adjusted under 35 U.S.C. 154(b) by 264 days.

(21) Appl. No.: 17/133,190

(22) Filed: Dec. 23, 2020

(65) Prior Publication Data

US 2022/0198947 A1 Jun. 23, 2022

(51) Int. Cl.
| G08G 5/54 | (2025.01) |
| B64D 45/04 | (2006.01) |
| B64F 1/16 | (2006.01) |
| B64U 10/17 | (2023.01) |
| B64U 70/93 | (2023.01) |
| B64U 101/40 | (2023.01) |
| B64U 101/45 | (2023.01) |

(52) U.S. Cl.
CPC ........... *G08G 5/54* (2025.01); *B64D 45/04* (2013.01); *B64F 1/16* (2013.01); *B64U 10/17* (2023.01); *B64U 70/93* (2023.01); *B64U 2101/40* (2023.01); *B64U 2101/45* (2023.01); *B64U 2201/20* (2023.01)

(58) Field of Classification Search
None
See application file for complete search history.

(56) References Cited

U.S. PATENT DOCUMENTS

| 5,716,032 A | 2/1998 | Melngvale |
| 8,265,808 B2 | 9/2012 | Garrec et al. |
| 8,301,326 B2 | 10/2012 | Malecki et al. |
| 8,386,095 B2 | 2/2013 | Fitzpatrick |
| 8,554,395 B2 | 10/2013 | Andersson |
| 8,630,755 B2 | 1/2014 | Ohtomo et al. |
| 8,946,340 B2 | 2/2015 | Yagyu et al. |
| 9,020,666 B2 | 4/2015 | Ohtomo et al. |
| 9,110,168 B2 | 8/2015 | Mohamadi |
| 9,208,689 B2 | 12/2015 | Fisher et al. |

(Continued)

FOREIGN PATENT DOCUMENTS

| CN | 204287959 U | 4/2015 |
| CN | 106991700 A | 7/2017 |

(Continued)

OTHER PUBLICATIONS

US 9,176,501 B2, 11/2015, Wang et al. (withdrawn)

(Continued)

*Primary Examiner* — Vivek D Koppikar
*Assistant Examiner* — David Ruben Pedersen
(74) *Attorney, Agent, or Firm* — Knobbe, Martens, Olson & Bear, LLP

(57) ABSTRACT

A mobile, unmanned aircraft takeoff and landing system includes a mobile, auto-leveling aircraft takeoff and landing platform, an unmanned aircraft, global position sensors on the landing platform and unmanned aircraft, and local position sensors on the on the landing platform and unmanned aircraft. The unmanned aircraft includes a flight controller that uses the global position sensors to fly to a vicinity of the landing platform and uses the local position sensors to autonomously land on the landing pad.

25 Claims, 13 Drawing Sheets

(56) References Cited

U.S. PATENT DOCUMENTS

| | | |
|---|---|---|
| 9,233,754 B1 | 1/2016 | Wang et al. |
| 9,302,783 B2 | 4/2016 | Wang |
| 9,346,560 B2 | 5/2016 | Wang |
| 9,367,067 B2 | 6/2016 | Gilmore et al. |
| 9,429,953 B1 | 8/2016 | Miller et al. |
| 9,448,562 B1 | 9/2016 | Sirang et al. |
| 9,493,235 B2 | 11/2016 | Zhou et al. |
| 9,501,060 B1 | 11/2016 | Zhang et al. |
| 9,511,858 B2 | 12/2016 | Fisher et al. |
| 9,568,919 B2 | 2/2017 | Lim |
| 9,623,760 B2 | 4/2017 | Wang et al. |
| 9,678,506 B2 | 6/2017 | Bachrach et al. |
| 9,688,403 B2 | 6/2017 | Winn et al. |
| 9,696,725 B2 | 7/2017 | Wang |
| 9,738,401 B1 | 8/2017 | Holt et al. |
| 9,805,238 B2 | 10/2017 | Falk et al. |
| 9,821,910 B1 | 11/2017 | Suiter |
| 9,845,165 B2 | 12/2017 | Michalski et al. |
| 9,864,372 B2 | 1/2018 | Chen et al. |
| 9,870,566 B2 | 1/2018 | Gong et al. |
| 9,945,828 B1 | 4/2018 | Poling et al. |
| 9,975,648 B2 | 5/2018 | Arnold |
| 9,977,434 B2 | 5/2018 | Mellinger |
| 10,061,328 B2 | 8/2018 | Canoy et al. |
| 10,124,908 B2 | 11/2018 | Stabler et al. |
| 10,137,984 B1 | 11/2018 | Flick |
| 10,149,276 B2 | 12/2018 | Akula et al. |
| 10,152,059 B2 * | 12/2018 | Banerjee ................. B64F 1/007 |
| 10,175,699 B2 | 1/2019 | Chiodini et al. |
| 10,269,133 B2 | 4/2019 | Hildreth |
| 10,281,930 B2 | 5/2019 | Hutson |
| 10,336,441 B2 | 7/2019 | Kim et al. |
| 10,370,122 B2 | 8/2019 | Fisher et al. |
| 10,379,545 B2 | 8/2019 | Kennedy et al. |
| 10,410,529 B2 | 9/2019 | Chiodini et al. |
| 10,462,366 B1 | 10/2019 | Bart et al. |
| 10,472,090 B2 | 11/2019 | Kessler et al. |
| 10,507,938 B2 | 12/2019 | Raz et al. |
| 10,509,416 B2 | 12/2019 | Wang |
| 10,509,417 B2 | 12/2019 | Van Cruyningen |
| 10,511,091 B2 | 12/2019 | Teague |
| 10,514,690 B1 | 12/2019 | Siegel et al. |
| 10,520,944 B2 | 12/2019 | Kunzi et al. |
| 10,527,720 B2 | 1/2020 | Apker et al. |
| 10,529,838 B2 | 1/2020 | Schulze et al. |
| 10,534,068 B2 | 1/2020 | Jaeger |
| 10,549,846 B2 | 2/2020 | Deng et al. |
| 10,586,464 B2 | 3/2020 | Dupray et al. |
| 2010/0224118 A1 * | 9/2010 | Hovland ................. B64F 1/007 114/261 |
| 2011/0273324 A1 | 11/2011 | Petillon |
| 2011/0285981 A1 | 11/2011 | Justice et al. |
| 2014/0316614 A1 | 10/2014 | Newman |
| 2015/0259078 A1 | 9/2015 | Filipovic et al. |
| 2016/0086497 A1 | 3/2016 | Williams et al. |
| 2016/0122038 A1 | 5/2016 | Fleischman et al. |
| 2017/0137150 A1 * | 5/2017 | Conyers ................. B60K 1/02 |
| 2017/0235018 A1 | 8/2017 | Foster et al. |
| 2017/0295069 A1 | 10/2017 | Sweet et al. |
| 2017/0313439 A1 | 11/2017 | Holt et al. |
| 2017/0337826 A1 | 11/2017 | Moran et al. |
| 2018/0017973 A1 | 1/2018 | Teague |
| 2018/0019802 A1 | 1/2018 | Teague |
| 2018/0025651 A1 | 1/2018 | Anderson |
| 2018/0039272 A1 | 2/2018 | Seydoux et al. |
| 2018/0130008 A1 | 5/2018 | Liu |
| 2018/0157255 A1 | 6/2018 | Halverson et al. |
| 2018/0186471 A1 | 7/2018 | Hutson et al. |
| 2018/0203465 A1 | 7/2018 | Suzuki |
| 2018/0237148 A1 | 8/2018 | Hehn et al. |
| 2018/0244387 A1 | 8/2018 | Russell |
| 2018/0253093 A1 | 9/2018 | Augugliaro et al. |
| 2018/0321328 A1 | 11/2018 | Kushleyev et al. |
| 2018/0356823 A1 | 12/2018 | Cooper |
| 2018/0357909 A1 | 12/2018 | Eyhorn |
| 2018/0357910 A1 * | 12/2018 | Hobbs ................. B64C 27/00 |
| 2019/0068829 A1 | 2/2019 | Van Schoyck et al. |
| 2019/0068953 A1 | 2/2019 | Choi et al. |
| 2019/0072983 A1 | 3/2019 | Zhang et al. |
| 2019/0102874 A1 | 4/2019 | Goja |
| 2019/0112048 A1 | 4/2019 | Culver |
| 2019/0163206 A1 | 5/2019 | Zhu et al. |
| 2019/0174063 A1 | 6/2019 | Huang et al. |
| 2019/0182428 A1 | 6/2019 | Huang et al. |
| 2019/0197908 A1 | 6/2019 | Mozer et al. |
| 2019/0208120 A1 | 7/2019 | Huang et al. |
| 2019/0235523 A1 | 8/2019 | Rozenberg et al. |
| 2019/0235525 A1 | 8/2019 | Cooper et al. |
| 2019/0243376 A1 | 8/2019 | Davis et al. |
| 2019/0248487 A1 | 8/2019 | Holtz et al. |
| 2019/0250601 A1 | 8/2019 | Donahoe et al. |
| 2019/0250640 A1 | 8/2019 | O'Flaherty et al. |
| 2019/0260122 A1 | 8/2019 | Li et al. |
| 2019/0276162 A1 * | 9/2019 | Shibata ................. B64F 1/007 |
| 2019/0278897 A1 | 9/2019 | Zhang et al. |
| 2019/0295033 A1 | 9/2019 | Longin et al. |
| 2019/0303861 A1 | 10/2019 | Mathias et al. |
| 2019/0310630 A1 | 10/2019 | Taviera |
| 2019/0310658 A1 | 10/2019 | Zhu |
| 2019/0353794 A1 | 11/2019 | Hiroi |
| 2019/0382141 A1 | 12/2019 | Kerr et al. |
| 2019/0393583 A1 | 12/2019 | Buydens et al. |
| 2020/0004272 A1 | 1/2020 | Pilskalns |
| 2020/0005656 A1 | 1/2020 | Saunamaeki |
| 2020/0012296 A1 | 1/2020 | Gurdan et al. |
| 2020/0020236 A1 | 1/2020 | Zhou et al. |
| 2020/0027360 A1 | 1/2020 | Casey et al. |
| 2020/0036896 A1 | 1/2020 | Kalinowski et al. |
| 2020/0041998 A1 | 2/2020 | Kushleyev et al. |
| 2020/0043348 A1 | 2/2020 | Ghosh et al. |
| 2020/0065590 A1 | 2/2020 | Carmichael |
| 2020/0073385 A1 | 3/2020 | Jobanputra et al. |
| 2020/0073409 A1 | 3/2020 | Mai |
| 2020/0079488 A1 | 3/2020 | Messori et al. |
| 2020/0083979 A1 | 3/2020 | Roberts et al. |
| 2021/0109546 A1 * | 4/2021 | Christiana ................. G05D 1/101 |
| 2021/0157336 A1 * | 5/2021 | Kwak ................. B64U 50/19 |

FOREIGN PATENT DOCUMENTS

| | | | |
|---|---|---|---|
| DE | 102018205134 A1 | 6/2018 | |
| DE | 102018120199 A1 | 2/2020 | |
| EP | 3326912 A1 | 5/2018 | |
| EP | 3476733 A1 | 8/2018 | |
| EP | 3476734 B1 | 9/2018 | |
| GB | 2440520 A * | 2/2008 | ............ B63B 17/00 |
| GB | 2559185 A | 1/2018 | |
| WO | WO 2012/065681 A2 | 5/2012 | |
| WO | WO 2016/154944 A1 | 10/2016 | |
| WO | WO 2016/154946 A1 | 10/2016 | |
| WO | WO 2017/081668 A1 | 5/2017 | |
| WO | WO 2017/147188 A1 | 8/2017 | |
| WO | WO 2017/223531 A1 | 12/2017 | |
| WO | WO 2018/231166 A1 | 12/2018 | |
| WO | WO 2019/048721 A1 | 3/2019 | |
| WO | WO 2019/151947 A1 | 8/2019 | |
| WO | WO 2019/182521 A1 | 9/2019 | |
| WO | WO 2019/226917 A1 | 11/2019 | |
| WO | WO 2020/016099 A1 | 1/2020 | |

OTHER PUBLICATIONS

G. Miko and A. Nemeth, "Combined communication and radio navigation system for small UAVs," 2013 23rd International Conference Radioelektronika (RADIOELEKTRONIKA), Pardubice, Czech Republic, 2013, pp. 284-287, doi: 10.1109/RadioElek.2013.6530932. (Year: 2013).*

Alcaron, et al. "A Precise and GNSS-Free Landing System on Moving Platforms for Rotary-Wing UAVs", Sensors, Feb. 20, 2019, pp. 1-37.

Anitha, et al. "Vision Based Autonomous Landing of an Unmanned Aerial Vehicle", Procedia Engineering, 38, (2012), pp. 2250-2256.

(56) References Cited

OTHER PUBLICATIONS

Antunes Joao, "How are High-Quality Magnetometer Technologies Being Used on UAVs", https://www.commercialuavnews.com/mining/how-are-high-quality-low-cost-magnetometer-technologies-being-used-on-uvas, pp. 1-6.
Baca, et al. "Autonomous Landing on a Moving Vehicle with an Unmanned Aerial Vehicle", *Journal of Field Robotics*, Jan. 2019, pp. 1-27.
Cho, et al. "Fully Automatic Taxiing, Takeoff and Landing of a UAV Using a Single-Antenna GPS Receiver Only", *GNSS Lab, School of Mechanical and Aerospace Engineering*, 2007, pp. 821-825.
Cordeiro, et al. "Improved Kalman-Based Attitude Estimation Framework for UAVs Via an Antenna Array", *Digital Signal Processing*, 59, (2016) pp. 49-65.
Embention. "Advanced GNSS Use Types and Their UAVs Application", https://www.embention.com/news/advanced-gnss-use-types-and-their-uavs-applications/, Mar. 9, 2019, pp. 1-4.
Feng, et al. "Autonomous Landing of a UAV on a Moving Platform Using Model Predictive Control", *Drones*, 2018, pp. 1-15.
Gui, et al. "Airborne Vision-Based Navigation Method for UAV Accuracy Landing Using Infrared Lamps", *J Intell Robot Syst*, (2013), 72: pp. 197-218.
Hermansson, Joel & Gising, Andreas & Skoglund, Martin & Schon, Thomas. (2010). Autonomous Landing of an Unmanned Aerial Vehicle. Reglermöte (Swedish Control Conference).
Huang, et al. "Research on UAVs Autonomous Target Landing with Image and GPS under Complex Environment", *IEEE*, 2019, pp. 97-102.
Kelner, Jan & Ziółkowski, Cezary. (2017). Doppler Effect-Based Automatic Landing Procedure for UAV in Difficult Access Environments. Journal of advanced transportation. 2017. 1-9. 10.1155/2017/8092718.
Khan, et al. "Auto Landing Sequence for an Unmanned Aerial Vehicle at a Fixed Point", *International Conference on Electrical, Computer and Communication engineering (ECCE)*, Feb. 16-18, 2017, pp. 175-180.
Khithov, V., Petrov, A., Tishchenko, I., Yakovlev, K. (2016). Toward autonomous UAV landing based on infrared beacons and particle filtering. In Proceedings of The 4th International Conference on Robot Intelligence Technology and Applications (RITA 2015), Bucheon, Korea, Dec. 14-16, 2015. pp. 529-537. Springer International Publishing.
Kong, et al. "Localization Framework for Real-Time UAV Autonomous Landing: An On-Ground Deployed Visual Approach", *Sensors*, 2017, pp. 1-17.
Lange, S., Sünderhauf, N., & Protzel, P. (2008). Autonomous Landing for a Multirotor UAV Using Vision. In Workshop Proceedings of SIMPAR 2008 Intl. Conf. on Simulation, Modeling and Programming for Autonomous Robots, Venice, Italy, Nov. 2008, 3-4, pp. 482-491, ISBN 978-88-95872-01-8.
Lee, Hanseob & Jung, Seokwoo & Shim, David. (2016). Vision-based UAV landing on the moving vehicle. 1-7. 10.1109/ICUAS.2016.7502574.
Lei, et al. "An Adaptive Altitude Information Fusion Method for Autonomous Landing Processes of Small Unmanned Aerial Rotorcraft", *Sensors*, 2012, pp. 13212-13224.
Ma, et al. "Stereo Vision Guiding for the Autonomous Landing of Fixed-Wing UAVs: A Saliency-Inspired Approach", *Int J Adv Robot Syst*, 2016, pp. 1-13.
Macron, et al. "Vision-Based and Differential Global Positioning System to Ensure Precise Autonomous Landing of UAVs", *Progress in Electromagnetics Research Symposium (PIERS)*, 2018, pp. 1-4.
Nguyen, et al. "Remote Marker-Based Tracking for UAV Landing Using Visible-Light Camera Sensor", *Sensor*, 2017, pp. 1-38.
Opromolla, Roberto. "Magnetometer Calibration for Small Unmanned Aerial Vehicles Using Cooperative Flight Data", *Sensor*, 2020, pp. 1-17.
Poliarus, et al. "Azimuth Estimation of Landmarks by Mobile Autonomous Robots Using One Scanning Antenna", *IEEE*, 2019, pp. 1682-1687.
Polvara, et al. "Vision-Based Autonomous Landing of a Quadrotor on the Perturbed Deck of an Unmanned Surface Vehicle", *Drones*, 2018, pp. 1-18.
Sani, et al. "Automatic Landing of a low-cost Quadrotor Using Monocular Vision and Kalman Filter in GPS-Denied Environments", *Turk J Eng & Comp Sci*, 2019, pp. 1821-1838.
Saripalli, et al. "Visually-Guided Landing of an Unmanned Aerial Vehicle", *Robotic Embedded Systems Laboratory, University of Southern California*, pp. 1-11.
Sefidgari, et al. "Auto Landing Process For Autonomous Flying Robot By Using Image Processing Based on Edge Detection", *Computer Science & Information Technology*, 2014, pp. 361-368.
Shahid, et al. "Autonomous Vehicle Using GPS and Magnetometer with HMI on LabVIEW", *IEEE*, 2016, pp. 163-167.
"Using Ugcs to Plan Magnetic and other Low Altitude UAV Survey Missions", https://www.ugcs.com/page/ugcs-to-plan-magnetic-and-other-low-altitude-uav-survey-mission, Accessed: Mar. 19, 2020, pp. 1-20.
Versteeg, Roelof & Mckay, Mark & Anderson, Matt & Johnson, Ross & Selfridge, Rj & Bennett, Jay. (2007). Feasibility Study for an Autonomous UAV Magnetometer System—Final Report on SERDP SEED 1509:2206. 10.2172/923485.
Wenzel, et al. "Automatic Take Off, Tracking and Landing of a Miniature UAV on a Moving Carrier Vehicle", pp. 1-18.
Wubben, et al. "A Vision-Based System for Autonomous Vertical Landing of Unmanned Aerial Vehicles", *European Union*, 2018, pp. 1-7.
Zhang, et al. "Autonomous Landing on Ground Target of UAV by Using Image-Based Visual Servo Control", *Proceedings of the $36^{th}$ Chinese Control Conference*, Jul. 26-28, 2017, pp. 11204-11209.

\* cited by examiner

AIRCRAFT AUTO LANDING SYSTEM

BACKGROUND

Field of the Inventions

The present inventions generally relate to the field of aircraft, for example, auto landing systems for aircraft, including unmanned aircraft.

Background Information

Recently, with the rapid development of unmanned aerial vehicle technology, unmanned aerial vehicles have been used for a wide range of industrial applications, such as agricultural uses including spraying, seeding and the like.

For the agricultural uses, improved efficiency can be obtained where the unmanned aerial vehicles fly over the ground while maintaining a target altitude relative to the ground. For example, for spraying operations, unmanned aerial vehicles preferably fly 3 to 5 meters above the ground (or 2 to 3 meters above crops). One example of a conventional autonomous aircraft is disclosed in Japanese Patent Application Publication No. H11-231049. With such autonomous flying control, an aircraft is controlled to follow a predetermined flight path. In addition, unmanned aerial vehicles are sometimes controlled to maintain a target altitude relative to the ground by detecting the altitude relative to the ground using a ground altimeter.

SUMMARY

An aspect of at least one of the inventions disclosed herein includes the realization that significant conveniences and efficiencies can be achieved with an automatic landing system for an unmanned aircraft incorporating a mobile landing pad elevated above the ground and configured such that an unmanned aircraft can reliably and repeatedly, autonomously land on the landing pad in a predetermined location and orientation, even if the mobile takeoff and landing pad has been moved after takeoff. For example, some unmanned aircraft, including those in the configuration of a conventional helicopter, can be relatively larger than many retail versions of "drones" and can be configured for heavier duty operations, such as agricultural purposes. In some systems, such as that disclosed in U.S. Patent Publication No. 2019/0726162, an unmanned aircraft can be designed to carry a significant amount of cargo weight for example, in the form of liquid agricultural chemicals weighing approximately 40 kilograms.

Unmanned aircraft of such size and power can tend to kick up significant amounts of dust and debris when they take off or land from an unpaved surface, which can cause damage to the aircraft's systems. Additionally, were such an aircraft to take off and land from on the ground, a worker would need to manually move the aircraft from a transportation vehicle, such as a utility vehicle, for takeoff and then return the aircraft to the transportation vehicle after landing on a return trip.

Further, such aircraft often need to be refilled with cargo, for example in the form of liquid agricultural chemicals, and/or fuel. Different users may have different levels of comfort in how close they would land such an unmanned aircraft to a service vehicle for the aircraft. Thus, the takeoff, landing, and servicing of such aircraft can require numerous steps and in some circumstances, more than one worker.

An aspect of at least one of the inventions disclosed herein includes the realization that multiple efficiencies, for example the elimination of previously necessary tasks, can be achieved by an auto landing system that can reliably control an unmanned aircraft to land, in a predetermined orientation, on a mobile landing pad. Thus, for example, in some embodiments, an embodiment of the present auto landing system includes a global position transducer and at least one local positioning transducer. In some embodiments, an unmanned aircraft includes a flight controller that receives a position of the landing pad and executes a landing mode operation in which the unmanned aircraft uses the received location coordinates as a waypoint for returning to the vicinity of the landing pad. Then, after reaching the vicinity of the landing pad, the unmanned aircraft communicates with the local position transducer on the landing pad for an automatic landing mode operation. Various different local position transducers can be used in various embodiments.

Another aspect of at least one of the inventions disclosed herein includes the realization that using at least a plurality of local position transducers on the landing pad can achieve additional efficiencies and accuracies for navigating the unmanned aircraft through the last few meters of movement from airspace above the landing pad into contact with the landing pad.

In some embodiments, the plurality of local position sensors comprise at least three distance transducers. For example, the distance transducers can comprise magnetic transducers or time of flight transducers (also known as "anchors"). Such transducers can be mounted at predetermined locations on the landing pad. Additionally, the unmanned aircraft can include a transponder (also known as a "tag") configured to communicate with the local position transducers so as to calculate a distance from the transponder on the unmanned aircraft to each of the at least three local position transducers.

An aspect of at least one of the inventions disclosed herein includes the realization that once an unmanned aircraft is within a range sufficient to establish reliable communication between the transponder and the local position transducers, the unmanned aircraft can then calculate at least three distances between the transponder and the three position transducers, respectively. With the transducers positioned at predetermined locations, the three calculated distances can be used together with the predetermined locations to calculate a unique solution of the distance and/or a flight path from the unmanned aircraft to the landing pad. For example, based on the geometry of the locations of the local position transducers on the landing pad and the orientation of the landing pad surface as well as the distances between the three transducers and the transponder on the unmanned aircraft, a distance between any point on or any point in space around the unmanned aircraft to a predetermined location on the landing pad. Additionally, the orientation of the aircraft relative to the landing pad can also be determined using the same dimensions.

The navigation system of the unmanned aircraft can use the calculated distance and relative orientation for controlling the propulsion system to the land the unmanned aircraft onto the landing pad. For example, the navigation system can use a calculated vector separating the predetermined points of the unmanned aircraft to the reference point on the landing pad as a target and a maneuver module can be configured to operate the propulsion system of the aircraft to gradually move the aircraft onto the landing pad in a desired orientation.

An aspect of at least one of the inventions disclosed herein includes the realization that such local position sensors, although they typically have only a short range of effectiveness and accuracy, can be used for navigation through the last few meters, and more beneficial, the last few centimeters of movement into contact with the landing pad, and thereby avoid the inherent imprecision of a GPS system. The significantly higher precision can allow the landing pad to be made smaller, and thus lighter and more efficient in design.

In some embodiments, general position systems can be used for a landing mode operation.

Thus, in some embodiments a mobile, unmanned aircraft takeoff and landing system with global and local positioning systems for automated return and landing of unmanned aircraft on a mobile landing platform, can comprise a vehicle with a structural assembly, a landing platform mounted to the vehicle. The landing platform can comprise a takeoff and landing pad having an upper surface configured for supporting an unmanned aircraft during before takeoff and after landing of the unmanned aircraft, a first general position module configured to detect and output a general position of the aircraft takeoff and landing platform, the general position comprising global position coordinates of the aircraft takeoff and landing platform, the first general position detection module comprising at least a first GPS device configured to detect a first characteristic of a global position of the takeoff and landing pad and at least a second general position sensor configured to detect a second characteristic of the global position of the takeoff and landing pad, wherein the first general position detection module is further configured to output the global position of the aircraft takeoff and landing platform to the unmanned aircraft, a first local relative position detection module configured to detect a local position of the unmanned aircraft relative to a predetermined location of the takeoff and landing pad, operable when the unmanned aircraft is within a finite range of airspace smaller than a maximum range of the first general position module, and with a higher precision than that which is possible with the first general position module, the first local relative position detection module comprising a plurality of local position detection devices mounted to the takeoff and landing pad and being configured to output data indicative of the local position of the unmanned aircraft relative to the predetermined location of the takeoff and landing pad, and a landing platform controller connected with the general position detection module, and the local relative position detection module, landing platform controller being configured to determine an at least one aspect of an attitude of the takeoff and landing pad and to output attitude data indicative of the attitude of the takeoff and landing pad. For example, the controller can be configured to detect a heading of the takeoff and landing pad. An unmanned aircraft can be configured to take off and land from the takeoff and landing pad, and can comprise a propulsion system configured to propel the unmanned aircraft in powered flight, a second general position detection module configured to detect and output a global position of the unmanned aircraft during flight, a second local relative position detection module configured to communicate with the first local relative position detection module and to determine the relative position between the unmanned aircraft and the predetermined location on the takeoff and landing pad based on the data indicative of the local position of the unmanned aircraft output from the first local relative position detection module, and a flight controller connected with the propulsion system, the second general position detection module, and the second local relative position detection module, the flight controller configured to receive the global position and the attitude data of the aircraft takeoff and landing platform from the first general position detection module, to control the propulsion system to automatically move the unmanned aircraft to a vicinity of the global position of the aircraft takeoff and landing platform, to control the second local relative position detection module to communicate with the first local relative position detection module on the takeoff and landing pad to determine the relative position and attitude between the unmanned aircraft and the takeoff and landing pad, and then to control the propulsion system to automatically land the unmanned aircraft at a predetermined position and at least one predetermined aspect of the aircraft's attitude on the takeoff and landing pad based on the communication between the first and second local relative position detection modules. For example, the at least one aspect of the aircraft's attitude can be a heading or "yaw" of the aircraft, and the predetermined aspect of the aircraft's heading can be a predetermined angular relationship to the heading of the takeoff and landing pad.

In some embodiments, the first local relative position detection module comprises a plurality of anchors mounted to the takeoff and landing pad at spaced apart locations, and wherein the second local relative position detection module comprises a tag mounted to the unmanned aircraft and configured to transmit blink signals to the plurality of anchors.

In some embodiments, the first and second local relative position detection modules are configured to operate under time of flight, time delay of arrival, or phase delay of arrival principles of operation.

In another embodiment, a mobile, unmanned aircraft takeoff and landing system can comprise a vehicle with a structural assembly, a landing platform mounted to the vehicle and which can comprise a takeoff and landing pad having an upper surface configured for supporting an unmanned aircraft during before takeoff and after landing of the unmanned aircraft, a first general position module configured to detect and output a first general position of the aircraft takeoff and landing platform, wherein the first general position detection module is further configured to output the first general position of the aircraft takeoff and landing platform to the unmanned aircraft, a first local relative position detection module configured to detect a local position of the unmanned aircraft relative to a predetermined location of the takeoff and landing pad, the first local relative position detection module comprising a plurality of local position detection devices mounted to the takeoff and landing pad and being configured to output data indicative of the local position of the unmanned aircraft relative to the predetermined location of the takeoff and landing pad, and a controller connected with the general position detection module, and the local relative position detection module. An unmanned aircraft can be configured to take off and land from the takeoff and landing pad, and can comprise a propulsion system configured to propel the unmanned aircraft in powered flight, a second general position detection module configured to detect and output a global position of the unmanned aircraft during flight, a second local relative position detection module configured to communicate with the first local relative position detection module and to determine the relative position between the unmanned aircraft and the predetermined location on the takeoff and landing pad based on the data indicative of the local position of the unmanned aircraft output from the first local relative position detection module, and a flight controller connected with the propulsion system, the second general position detection module, and the second local relative position detection module, and configured to control the second local relative position detection module to communicate with the first local relative position detection module on the takeoff and landing pad to determine the relative position and orientation between the unmanned aircraft and the takeoff and landing pad, and then to control the propulsion system to automatically land the unmanned aircraft at a predetermined position and orientation on the takeoff and landing pad based on the communication between the first and second local relative position detection modules.

In some embodiments, the first local relative position detection module comprises a plurality of anchors mounted to the takeoff and landing pad at spaced apart locations, and wherein the second local relative position detection module comprises a tag mounted to the unmanned aircraft and configured to transmit blink signals to the plurality of anchors.

In some embodiments, the first and second local relative position detection modules are configured to operate under time of flight, time delay of arrival, or phase delay of arrival principles of operation.

In some embodiments, the first general position comprises global position coordinates of the aircraft takeoff and landing platform, the first general position detection module comprising at least a first GPS device configured to detect a first characteristic of a global position of the takeoff and landing pad and at least a second general position sensor configured to detect a second characteristic of the global position of the takeoff and landing pad.

In some embodiments, the first local relative position detection module is operable when the unmanned aircraft is within a range of airspace shorter than a maximum range of the first general position module, and with a higher precision than that which is possible with the first general position module.

In some embodiments, the flight controller is further configured to receive the global position of the aircraft takeoff and landing platform from the first general position detection module and to control the propulsion system to automatically move the unmanned aircraft to a vicinity of the first general position of the aircraft takeoff and landing platform.

An aircraft takeoff and landing system can comprise a landing platform which can comprise a takeoff and landing pad having an upper surface configured for supporting an unmanned aircraft during before takeoff and after landing of the unmanned aircraft, a first general position module configured to detect and output a first general position of the aircraft takeoff and landing platform and to output the first general position of the aircraft takeoff and landing platform to the unmanned aircraft, and a first local relative position detection module configured to detect a local position of the unmanned aircraft relative to a predetermined location of the takeoff and landing pad. An aircraft can be configured to takeoff and land from the takeoff and landing pad, the aircraft can comprise a propulsion system configured to propel the aircraft in powered flight, a second general position detection module configured to detect a second general position of the unmanned aircraft during flight, a second local relative position detection module configured to communicate with the first local relative position detection module and to detect a relative position between the aircraft and the landing pad, and a flight controller connected with the propulsion system and the second local relative position detection module, and configured to control the propulsion system to automatically land the aircraft at a predetermined position on the takeoff and landing pad based on the communication between the first and second local relative position detection modules.

In some embodiments, the first local relative position detection module comprises a plurality of anchors mounted to the takeoff and landing pad at spaced apart locations, and wherein the second local relative position detection module comprises a tag mounted to the aircraft and configured to transmit blink signals to the plurality of anchors.

In some embodiments, the first and second local relative position detection modules are configured to operate under time of flight, time delay of arrival, or phase delay of arrival principles of operation.

In some embodiments, the first general position comprises global position coordinates of the aircraft takeoff and landing platform, the first general position detection module comprising at least a first GPS device configured to detect a first characteristic of a global position of the takeoff and landing pad, and a second general position sensor configured to detect a second characteristic of the global position of the takeoff and landing pad, wherein the flight controller is further configured to control the propulsion system to land the aircraft in a predetermined orientation on the takeoff and landing pad based on the first and second characteristics.

In some embodiments, the first local relative position detection module is operable when the aircraft is within a range of airspace shorter than a maximum range of the first general position module, and with a higher precision than that which is possible with the first general position module.

In some embodiments, the flight controller is further configured to receive the global position of the aircraft takeoff and landing platform from the first general position detection module and to control the propulsion system to automatically move the aircraft to a vicinity of the first general position of the aircraft takeoff and landing platform.

In some embodiments, the first local relative position detection module comprises a plurality of local position detection devices mounted to the takeoff and landing pad and being configured to output data indicative of the local position of the aircraft relative to the predetermined location of the takeoff and landing pad.

In some embodiments, a controller can be connected with the first general position detection module, and the first local relative position detection module.

In some embodiments, the first general position module is configured to detect a pad attitude of the takeoff and landing pad and output attitude data indicative of the pad attitude of the takeoff and landing pad, and wherein the flight controller is configured to receive the attitude data and to land the unmanned aircraft with a landing attitude oriented with a predetermined angular relationship relative to the pad attitude.

In some embodiments, the second local relative position detection module is configured to determine the relative position between the aircraft and a predetermined location on the takeoff and landing pad based on the data indicative of the local position of the aircraft output from the first local relative position detection module.

In yet other embodiments, an unmanned aircraft configured for takeoff and landing on a landing platform, and can comprise a propulsion system configured to propel the unmanned aircraft in powered flight, a general position detection module configured to detect and output general position data indicative of a general position of the unmanned aircraft during flight, the general position data comprising global position coordinate data, a local relative position detection module configured to communicate with a plurality of local relative position detection devices mounted on a mobile takeoff and landing pad and configured to detect a plurality of distances between the unmanned aircraft and the plurality of local relative position detection devices, the local relative position detection module further configured to output local position data indicative of a the plurality of distances, wherein the local position detection module comprises a higher precision and accuracy that that of the general position detection module, and a flight controller connected with the propulsion system, the general position detection module, and the local relative position detection module, the flight controller configured to control the propulsion system to propel the unmanned aircraft to a vicinity of the global position of the aircraft takeoff and landing platform, to control the local relative position detection module to determine the relative position and orientation between the unmanned aircraft and a landing pad, and then to control the propulsion system to automatically land the unmanned aircraft at a predetermined position and predetermined attitude on the takeoff and landing pad based on the output from the local relative position detection module.

In some embodiments, the local relative position detection module comprises a tag mounted to the unmanned aircraft and configured to transmit blink signals to a plurality of anchors mounted to the mobile takeoff and landing pad at spaced apart locations.

In some embodiments, the local relative position detection module is configured to operate under time of flight, time delay of arrival, or phase delay of arrival principles of operation.

In yet other embodiments, an unmanned aircraft configured for takeoff and landing on a landing platform can comprise a propulsion system configured to propel the unmanned aircraft in powered flight, a general position detection module configured to detect and output general position data indicative of a general position of the unmanned aircraft during flight, the general position data comprising global position coordinate data, a local relative position detection module configured to communicate with a plurality of local relative position detection devices mounted on a mobile takeoff and landing pad and configured to detect a plurality of distances between the unmanned aircraft and the plurality of local relative position detection devices, and a flight controller connected with the propulsion system, the general position detection module, and the local relative position detection module, the flight controller configured to control the propulsion system to propel the unmanned aircraft to a vicinity of the global position of the aircraft takeoff and landing platform, to control the local relative position detection module to determine the relative position between the unmanned aircraft and a landing pad, and then to control the propulsion system to automatically land the unmanned aircraft at a predetermined position on the takeoff and landing pad based on the output from the local relative position detection module.

In some embodiments, the local relative position detection module comprises a tag mounted to the unmanned aircraft and configured to transmit blink signals to a plurality of anchors mounted to the takeoff and landing pad at spaced apart locations.

In some embodiments, the local relative position detection module is configured to operate under time of flight, time delay of arrival, or phase delay of arrival principles of operation.

In some embodiments, the local relative position detection module is further configured to output local position data indicative of the plurality of distances, wherein the local position detection module comprises a higher precision and accuracy that that of the general position detection module.

In some embodiments, the flight controller is configured receive attitude data indicative of a pad attitude of the mobile takeoff and landing pad, and wherein the flight controller is configured to automatically land the unmanned aircraft with a landing attitude oriented with a predetermined angular relationship relative to the pad attitude.

In other embodiments, an aircraft configured for takeoff and landing on a mobile landing platform can comprise a propulsion system configured to propel the aircraft in powered flight, a local relative position detection module configured to communicate with a plurality of local relative position detection devices mounted on a takeoff and landing pad, and a flight controller connected with the propulsion system and the local relative position detection module, and configured to control the local relative position detection module to determine the relative position and orientation between the aircraft and a landing pad, and then to control the propulsion system to automatically land the aircraft on the takeoff and landing pad in a predetermined orientation based on the output from the local relative position detection module.

In some embodiments, the local relative position detection module comprises a tag mounted to the aircraft and configured to transmit blink signals to a plurality of anchors mounted to the takeoff and landing pad at spaced apart locations.

In some embodiments, the local relative position detection module is configured to operate under time of flight, time delay of arrival, or phase delay of arrival principles of operation.

In some embodiments, a general position detection module can be connected to the flight controller, wherein the local relative position detection module is further configured to output local position data indicative of a plurality of distances between the plurality of local relative position detection devices, respectively, and the aircraft, wherein the local position detection module comprises a higher precision and accuracy that that of the general position detection module.

In some embodiments, the flight controller is configured receive attitude data indicative of a pad attitude of the takeoff and landing pad, and wherein the flight controller is configured to automatically land the aircraft with a landing attitude oriented with a predetermined angular relationship relative to the pad attitude.

In some embodiments, a general position detection module can be configured to detect and output general position data indicative of a general position of the aircraft during flight.

In some embodiments, the general position data comprises global position coordinate data.

In some embodiments, the flight controller is further configured to control the propulsion system to propel the aircraft to a vicinity of the general position of the aircraft takeoff and landing platform.

In some embodiments, the local relative position detection module is configured to detect a plurality of distances between the aircraft and the plurality of local relative position detection devices.

In yet additional embodiments, a mobile, unmanned aircraft takeoff and landing system with global and local positioning systems for automated return and landing of unamanned aircraft on mobile landing platform can comprise a vehicle with a structural assembly. An aircraft takeoff and landing platform mounted to the vehicle can comprise a takeoff and landing pad having an upper surface configured for supporting an unmanned aircraft during before takeoff and after landing of the unmanned aircraft, a first general position module configured to detect and output a general position and an attitude of the aircraft takeoff and landing platform, the general position comprising global position coordinates of the aircraft takeoff and landing platform, and the attitude comprising attitude data indicative of the attitude of the aircraft takeoff and landing platform, the first general position detection module comprising at least a first GPS device configured to detect a first characteristic of a global position of the takeoff and landing pad and at least a second general position sensor configured to detect a second characteristic of the global position of the takeoff and landing pad, wherein the first general position detection module is further configured to output the global position and the attitude data of the aircraft takeoff and landing platform to the unmanned aircraft. A first local relative position detection module can be configured to detect a local position of the unmanned aircraft relative to a predetermined location of the takeoff and landing pad, operable when the unmanned aircraft is within a finite range of airspace smaller than a maximum range of the first general position module, and with a higher precision than that which is possible with the first general position module, the first local relative position detection module comprising a plurality of local position detection devices mounted to the takeoff and landing pad and being configured to output data indicative of the local position of the unmanned aircraft relative to the predetermined location of the takeoff and landing pad, and a landing platform controller can be connected with the general position detection module, and the local relative position detection module.

In some embodiments, the first local relative position detection module comprises a plurality of anchors mounted to the takeoff and landing pad at spaced apart locations configured to communicate with a tag, mounted to the unmanned aircraft, configured to transmit blink signals to the plurality of anchors.

In some embodiments, the first local relative position detection module is configured to operate under time of flight, time delay of arrival, or phase delay of arrival principles of operation.

In yet further embodiments, an unmanned aircraft takeoff and landing system, can comprise a landing platform comprising a takeoff and landing pad having an upper surface configured for supporting an unmanned aircraft during before takeoff and after landing of the unmanned aircraft, a general position module configured to detect and output a general position and an orientation of the aircraft takeoff and landing platform, wherein the general position detection module is further configured to output the general position and the orientation of the aircraft takeoff and landing platform to the unmanned aircraft, a local relative position detection module configured to detect a local position of the unmanned aircraft relative to a predetermined location of the takeoff and landing pad, the local relative position detection module comprising a plurality of local position detection devices mounted to the takeoff and landing pad and being configured to output data indicative of the local position of the unmanned aircraft relative to the location of the takeoff and landing pad, and a controller connected with the general position detection module, and the local relative position detection module.

In some embodiments, the local relative position detection module comprises a plurality of anchors mounted to the takeoff and landing pad at spaced apart locations and configured to communicate with a tag, mounted to the unmanned aircraft, configured to transmit blink signals to the plurality of anchors.

In some embodiments, the local relative position detection module is configured to operate under time of flight, time delay of arrival, or phase delay of arrival principles of operation.

In some embodiments, the general position of the aircraft takeoff and landing platform comprises global position coordinates of the aircraft takeoff and landing platform, the general position detection module comprising at least a first GPS device configured to detect a first characteristic of a global position of the takeoff and landing pad and at least a second general position sensor configured to detect a second characteristic of the global position of the takeoff and landing pad.

In some embodiments, the local relative position detection module is operable when the unmanned aircraft is within a range of airspace shorter than a maximum range of the general position module, and with a higher precision than that which is possible with the general position module.

In yet other embodiments, an aircraft takeoff and landing system can comprise a takeoff and landing pad having an upper surface configured for supporting an aircraft during before takeoff and after landing of the aircraft. A general position module can be configured to detect a general position of the aircraft takeoff and landing platform and to output the general position of the aircraft takeoff and landing platform to the aircraft. A local relative position detection module configured to detect a local position of the aircraft relative to the takeoff and landing pad.

In some embodiments, the local relative position detection module comprises a plurality of anchors mounted to the takeoff and landing pad at spaced apart locations configured to communicate with a tag, mounted to the aircraft, configured to transmit blink signals to the plurality of anchors.

In some embodiments, the local relative position detection module is configured to operate under time of flight, time delay of arrival, or phase delay of arrival principles of operation.

In some embodiments, the general position comprises global position coordinates of the aircraft takeoff and landing platform, the general position detection module comprising a GPS device configured to detect a first characteristic of a global position of the takeoff and landing pad and at least a second general position sensor configured to detect a second characteristic of the global position of the takeoff and landing pad, and a controller connected to the GPS device and the second general position sensor, the controller configured to detect an attitude of the takeoff and landing pad and to output attitude data indicative of the attitude, the controller further configured to output the attitude data to the aircraft.

In some embodiments, the local relative position detection module is operable when the aircraft is within a range of airspace shorter than a maximum range of the general position module, and with a higher precision than that which is possible with the general position module.

In some embodiments, the local relative position detection module comprises a plurality of local position detection devices mounted to the takeoff and landing pad and being configured to output data indicative of the local position of an aircraft relative to the takeoff and landing pad.

In yet other embodiments, a mobile, aircraft takeoff and landing system can comprise a landing platform which can have a takeoff and landing pad having an upper surface configured for supporting an unmanned aircraft, and a position detecting module configured to detect a position and an attitude of the aircraft takeoff and landing platform and to output position data indictive of the position of the of the aircraft takeoff and landing platform and attitude data indicative of the attitude of the aircraft takeoff and landing platform. An aircraft can be configured to takeoff and land from the takeoff and landing pad, the aircraft comprising a propulsion system configured to propel the aircraft in powered flight, and a flight controller connected with the propulsion system configured to receive the position data and the attitude data and further configured to automatically land the aircraft at a predetermined position and at a predetermined attitude on the takeoff and landing pad based on the received receive the position data and the attitude data.

In other embodiments, an aircraft configured for takeoff and landing on a mobile landing platform can comprise a propulsion system configured to propel the aircraft in powered flight, and a flight controller connected with the propulsion system and configured to receive position data indicative of a position of the mobile landing platform and attitude data indicative of an attitude of the mobile landing platform, the flight controller further configured to automatically land the aircraft at a predetermined position on the mobile landing platform and at a predetermined attitude on the mobile landing platform, based on the position data and the attitude data.

In yet other embodiments, a mobile, aircraft takeoff and landing system can comprise a takeoff and landing pad having an upper surface configured for supporting an aircraft during before takeoff and after landing of the aircraft and a position detecting module configured to detect a position and an attitude of the aircraft takeoff and landing platform and to output to an aircraft, position data indicative of the position of the of the aircraft takeoff and landing platform and to output to the aircraft attitude data indicative of the attitude of the aircraft takeoff and landing platform.

Also, other features, aspects and advantages of the disclosed aircraft will become apparent to those skilled in the field of manufacturing aircrafts from the following detailed description, which, taken in conjunction with the annexed drawings, discloses several illustrative embodiments of an aircraft with various features.

BRIEF DESCRIPTION OF THE DRAWINGS

Referring now to the attached drawings which form a part of this original disclosure.

Figure 1:
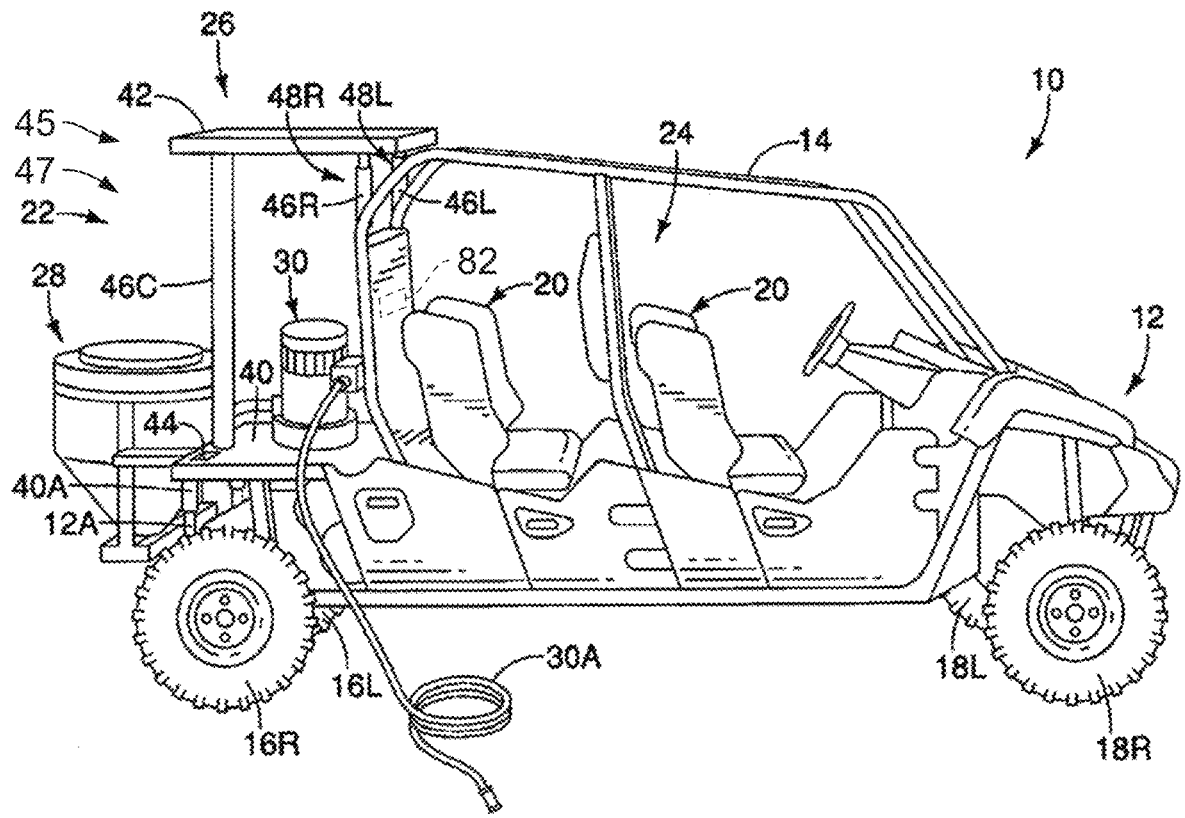
FIG. 1 is a right side view of a utility task vehicle with an aircraft platform in accordance with one embodiment.

It should be noted that these figures are intended to illustrate the general characteristics of methods, structure and/or materials utilized in certain illustrative embodiments and to supplement the written description provided below. These drawings are not, however, to scale and may not precisely reflect the precise structural or performance characteristics of any given embodiment, and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

The inventions disclosed herein are described below in the context of auto landing systems for unmanned, vertical takeoff and landing aircraft in conjunction with mobile landing and takeoff platforms, because the inventions disclosed herein have particular utility in this context. However, the inventions disclosed herein are applicable to other contexts as well. For example, the inventions disclosed herein can be applied to other types of aircraft, including fixed wing and other non-vertical takeoff aircraft as well as all types of manned aircraft. It is apparent to those skilled in the art from this disclosure that the following descriptions of the embodiments are provided for illustration only and not for the purpose of limiting the inventions and their equivalents. Like reference numerals in the drawings denote like similar or identical elements or features, and thus the descriptions of the similar or identical elements or features may be omitted in later embodiments.

Referring initially to FIG. 1, a utility task vehicle or side-by-side vehicle 10 (e.g., a vehicle) is illustrated in accordance with one embodiment. In the illustrated embodiment, for example, the utility task vehicle 10 is a small 2- to 6-person four-wheel drive off-road vehicle. In the illustrated embodiment, the utility task vehicle 10 includes a vehicle body 12 with a roll cage 14, a pair of rear wheels 16R and 16L, a pair of front wheels 18R and 18L and a plurality of seats 20. The body 12, the underlying vehicle frame (not shown) and the roll cage can be considered as forming a structural assembly of the utility task vehicle 10. The utility task vehicle 10 further includes many other conventional vehicle components, such as an engine, a transmission, a steering wheel, an accelerator pedal, a brake system, etc. that are typically provided on utility task vehicles. However, for the sake of brevity, some vehicle components not needed for understanding of the present inventions are omitted from the description herein.

In the following description, the terms "front" and "forward" refer to a direction in which the driver looks straight when seated on a driver seat of the seats 20. Also in the following description, the terms "rear," "rearward" and "backward" refer to a direction opposite to the front or forward direction.

As illustrated in FIG. 1, the utility task vehicle 10 has an open cargo area 22 at the rear of the utility task vehicle 10 behind a cabin 24 that is defined by the roll cage 14. The utility task vehicle 10 also has a levelling aircraft platform 26, a refilling tank 28 and a refilling pump 30 in the open cargo area 22.

As illustrated in FIG. 1, the aircraft platform 26 includes a base 40, a landing pad 42, an accelerometer 44 (e.g., level sensor) and three support legs 46R, 46L and 46C (e.g., at least three support legs). The aircraft platform 26 also includes a pair of (a plurality of) linear actuators 48R and 48L (e.g., at least one actuator) at the support legs 46R and 46L, respectively. The aircraft platform 26 can be considered as serving as an auto-leveling, aircraft takeoff and landing platform.

The base 40 includes a flat panel that forms a bottom of the open cargo area 22. The base 40 has a pair of sockets 40A (e.g., vehicle adapters) on a lower surface of the base 40 at right and left rear corners of the base 40. The sockets 40A receive a pair of posts 12A (e.g., base adapters) of the vehicle body 12, respectively. For example, the posts 12A of the vehicle body 12 are fixedly coupled to the sockets 40A. With this configuration, the aircraft platform 26 is securely mounted to the utility task vehicle 10. In the illustrated embodiment, the sockets 40A is an example of the vehicle adapters that secure the aircraft platform 26 to the utility task vehicle 10, while the posts 12A is an example of the base adapters that receive the base 40. However, the base 40 can be fixedly coupled to the vehicle body 12 in a different manner typically used for coupling components of the utility task vehicles. Optionally, the leveling aircraft platform 26 can be mounted above or on top of a roll cage 14, described in greater detail below with reference to FIG. 4B.

The landing pad 42 also includes a flat panel that forms a top of the open cargo area 22. The landing pad 42 can be located even with, above the top of the roll cage 14, or mounted on top of the roll cage 14. In the illustrated embodiment, the landing pad 42 is movably supported on the base 40. For example, the landing pad 42 is supported by the support legs 46R, 46L and 46C relative to the base 40. In the illustrated embodiment, two support legs 46R and 46L (front right and left support legs) are disposed at a front portion of the base 40, while one support leg 46C (rear center support leg) are disposed at a rear portion of the base 40. The right and left support legs 46R and 46L vertically extend from right and left rear vertical sections of the roll cage 14, respectively. On the other hand, the center support leg 46C vertically extends from the top surface of the base 40 at a rear center of the base 40. In the illustrated embodiment, the right and left support legs 46R and 46L are adjustable in height with the linear actuators 48R and 48L, while the center support leg 46C are non-adjustable in height. Upper ends of the support legs 46R, 46L and 46C are pivotally coupled to the landing pad 42 with ball joints or ball-and-socket joints, respectively, at joint locations L1, L2 and L3, respectively (see FIG. 5). Of course, the support legs 46R, 46L and 46C can be coupled to the landing pad 42 with any other type of conventional joints that allow movement of the landing pad 42 relative to the support legs 46R, 46L and 46C.

Figure 4A:
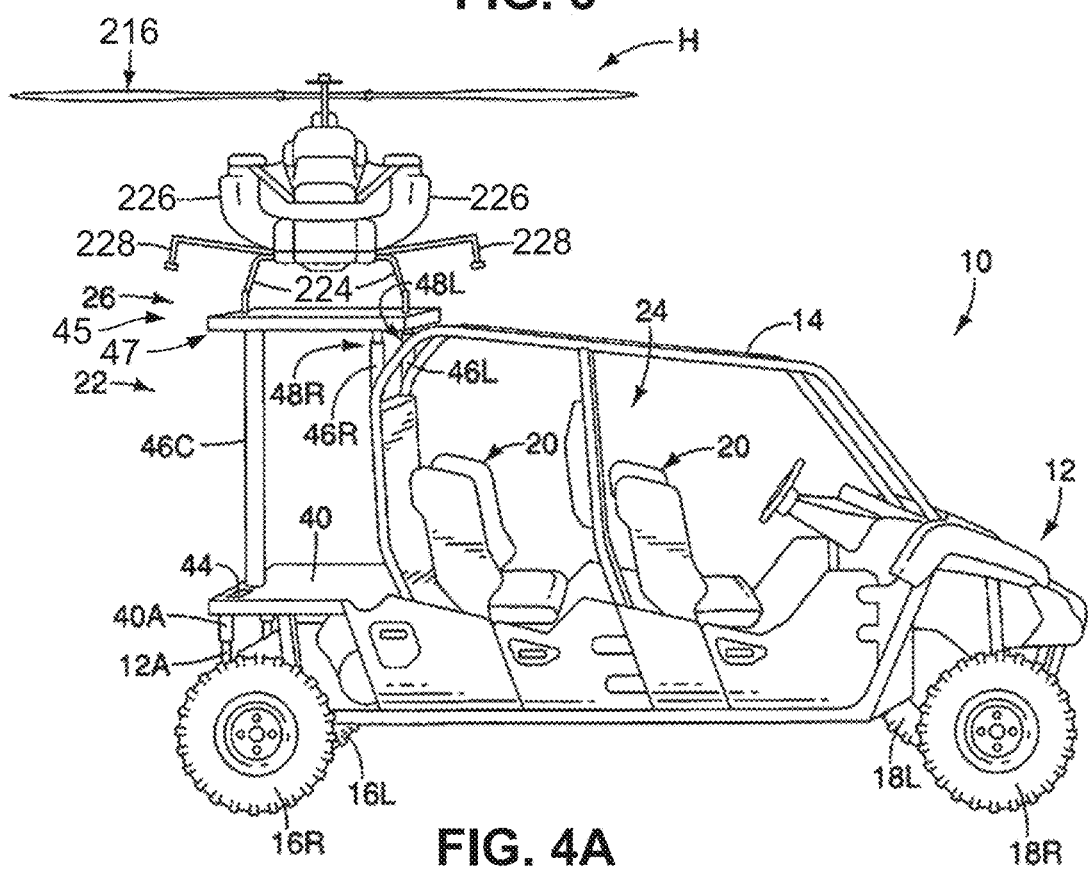
FIG. 4A is a right side view of the utility task vehicle illustrated in FIG. 1, in which the unmanned helicopter is located on the landing pad of the aircraft platform while the nose of the unmanned helicopter pointing a right direction of the utility task vehicle and the refilling tank and the refilling pump removed from the utility task vehicle.
Figure 4B:
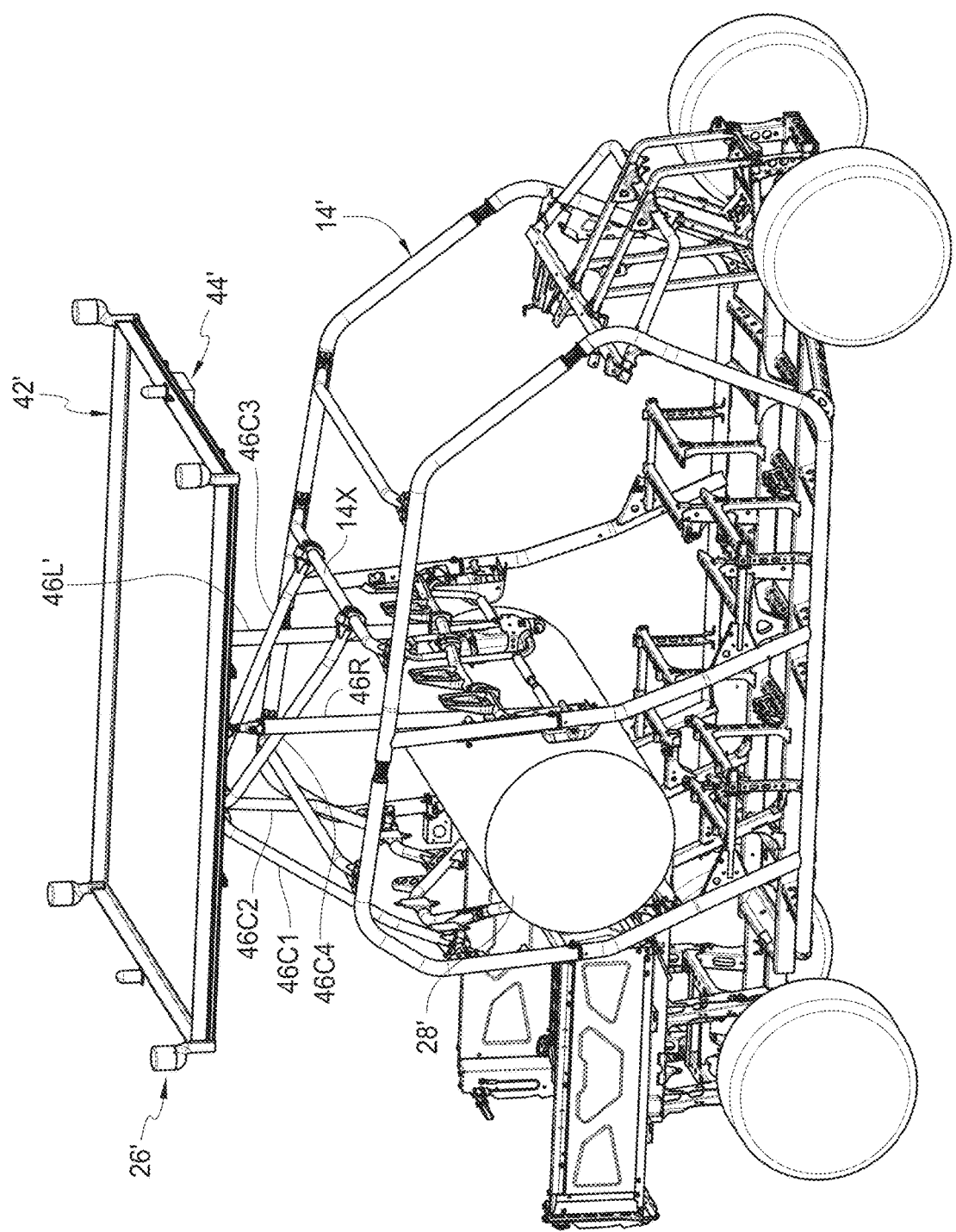
FIG. 4B is a perspective view of structural frame and roll cage of a modification of the utility task vehicle illustrated in FIG. 1, with rear seats replaced with a larger tank and with a modification of the aircraft platform mounted on top of the structural frame.

FIG. 4B illustrates a variation of the leveling aircraft platform 26, identified generally by the reference numeral 26'. In this modification, the leveling aircraft platform 26' is mounted to a roll cage 14' of a modified vehicle similar to the vehicle 10. The roll cage includes one or more crossbars 14X. In this variation, the rear leg 46C is formed of four legs 46C1, 46C2, 46C3, 46C4 connected to various parts of the frame and/or roll cage 14'. For example, the forward legs 46C3, 46C4 are attached to a cross member 14X. The rear legs 46C1, 46C2 are attached to other portions of roll cage 14'. The upper end of the legs 46C1, 46C2, 46C3, 46C4, are connected to the landing pad 42' with a ball joint. Similarly, the actuators 46R'4 and 46L' are attached to another portion of the frame or roll cage 14' of the vehicle, with the upper ends attached to the lower surface of the landing pad 42', also with ball joints. All three of the ball joints are separated from each other. Whether in the form of the aircraft platform 26 or 26', adjustment of the inclination of the landing pad 42, 42' can be adjusted as described below, although only the vehicle 10 and aircraft platform 26 is referenced below, the descriptions apply equally to both the platforms 26 and 26'. The embodiment of the leveling aircraft platform of FIG. 4B does not include a flat base 40 supporting the legs 46C1, 46C2, 46C3, 46C4 and actuators 46R' and 46L'. The accelerometer 44' can be mounted to the landing pad 42'. In other embodiments, the accelerometer 44' can be mounted to frame or roll cage 14 of the vehicle 10' that is fixed relative to the frame, roll cage 14' or other mounting locations of the lower ends of the supporting the legs 46C1, 46C2, 46C3, 46C4 and actuators 46R' and 46L'.

Figure 2:
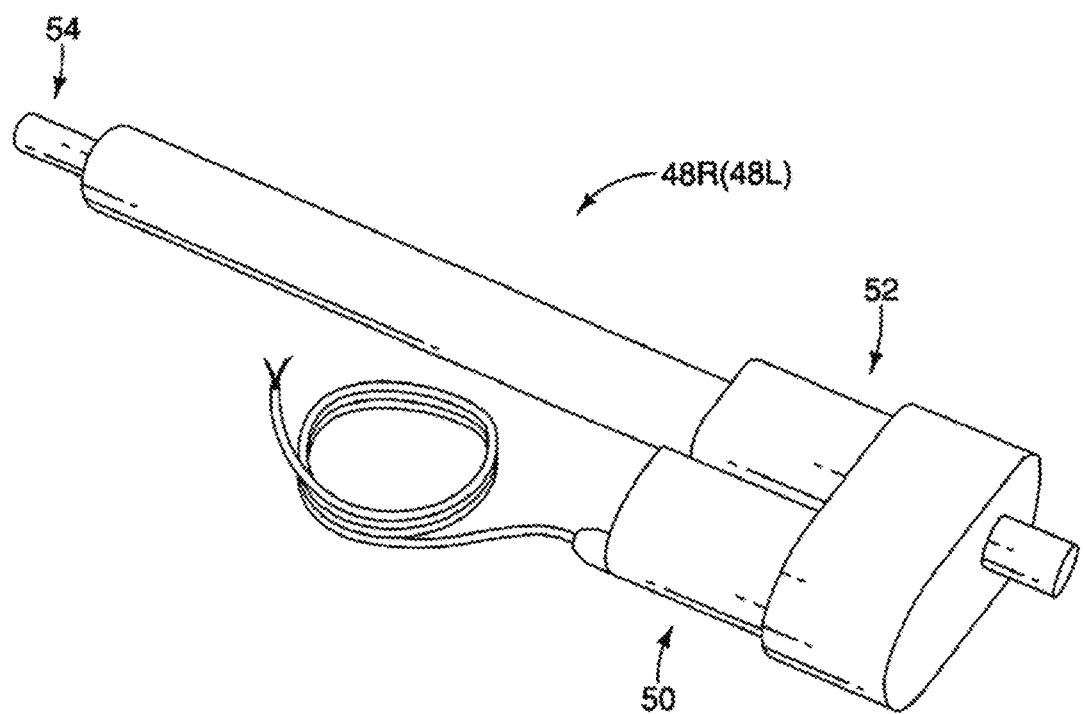
FIG. 2 is a perspective view of a linear actuator of the aircraft platform illustrated in FIG. 1.

As shown in FIG. 2, the linear actuators 48R and 48L each have an electric motor 50, a gear mechanism 52 and a sliding rod 54. The gear mechanism 52 is operatively coupled between the electric motor 50 and the sliding rod 54, and converts the rotation of the electric motor 50 into the sliding movement of the sliding rod 54. In the illustrated embodiment, the linear actuators 48R and 48L are connected to change the inclination of the landing pad 42. For example, the distal ends of the sliding rods 54 of the linear actuators 48R and 48L are connected to the landing pad 42 to change the inclination of the landing pad 42 by the sliding movement of the sliding rods 54. In the illustrated embodiment, the distal ends of the sliding rods 54 of the linear actuators 48R and 48L form the upper ends of the support legs 46R and 46L, respectively. The linear actuators 48R and 48L have a relatively conventional configuration, and thus will not be described in detail. Of course, the linear actuators 48R and 48L are not limited to this configuration, and can be any other type of conventional linear actuators, such as hydraulic or pneumatic actuators.

Figure 3:
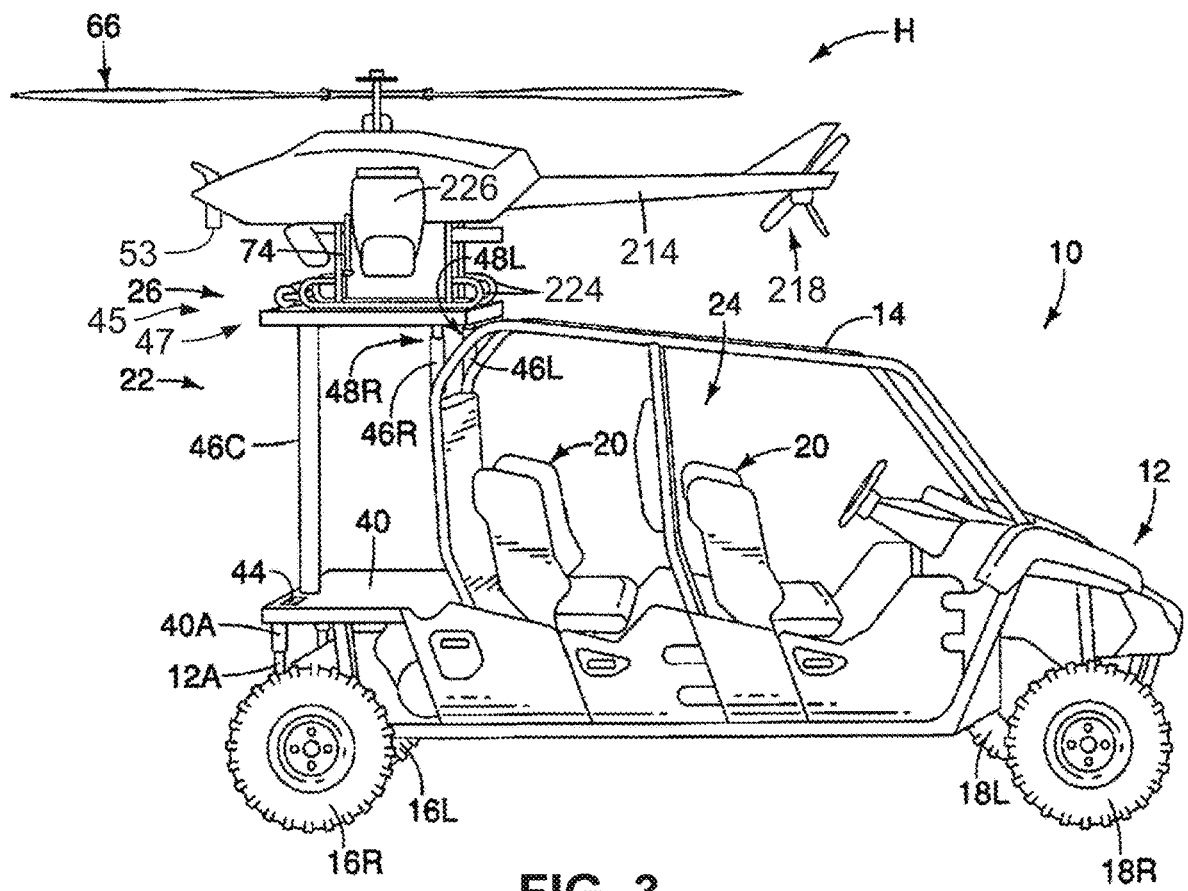
FIG. 3 is a right side view of the utility task vehicle illustrated in FIG. 1, in which an unmanned helicopter is located on a landing pad of the aircraft platform with a nose of the unmanned helicopter pointing a rear direction of the utility task vehicle and a refilling tank and a refilling pump removed from the utility task vehicle.

With this configuration, as shown in FIGS. 3 and 4A, the aircraft platform 26 of the utility task vehicle 10 is utilized as a platform for takeoffs and landings of an unmanned helicopter H (e.g., an aircraft).

Referring to FIG. 1, in the illustrated embodiment, the refilling tank 28 of the utility task vehicle 10 holds the agricultural material, such as chemicals, fertilizers and the like, for crops, that is to be refilled in the liquid tanks 72 of the unmanned helicopter H. For example, the refilling tank 28 is fluidly connected to the liquid tanks of the unmanned helicopter H for refilling the agricultural material while the unmanned helicopter H is located on the aircraft platform 26 of the utility task vehicle 10. In particular, the refilling tank 28 is fluidly connected to the liquid tanks of the unmanned helicopter H through the refilling pump 30 and a refilling hose 30A that extends from the refilling pump 30. In the illustrated embodiment, the refilling pump 30 includes an electrically powered pump for pumping the agricultural material from the refilling tank 28 to the liquid tanks 72 of the unmanned helicopter H. With this configuration, the utility task vehicle 10 can provide a closed chemical loading system for refilling the liquid tanks 72 of the unmanned helicopter H with minimal chemical exposure for operators. In the illustrated embodiment, the refilling tank 28 holds the agricultural material to be refilled in the liquid tanks of the unmanned helicopter H. Of course, the refilling tank 28 can holds other material to be supplied to the unmanned helicopter H, such as fuel for the engine of the unmanned helicopter H.

With reference to FIGS. 3 and 4A, the unmanned helicopter H can be located on the aircraft platform 26 of the utility task vehicle 10 while facing in any direction with respect to the utility task vehicle 10, including directions opposite to those illustrated. For example, the unmanned helicopter H can be located on the aircraft platform 26 of the utility task vehicle 10 while a nose of the unmanned helicopter H points the rear direction of the utility task vehicle 10 (FIG. 3), or the opposite direction with the nose of the unmanned helicopter H pointing toward the front of the utility task vehicle 10 (not illustrated). The unmanned helicopter H can be located on the aircraft platform 26 of the utility task vehicle 10 while the nose of the unmanned helicopter H points the right direction of the utility task vehicle 10 (FIG. 4A), or the opposite direction with the nose of the unmanned helicopter H pointing toward the left of the utility task vehicle 10 (not illustrated).

Figure 5:
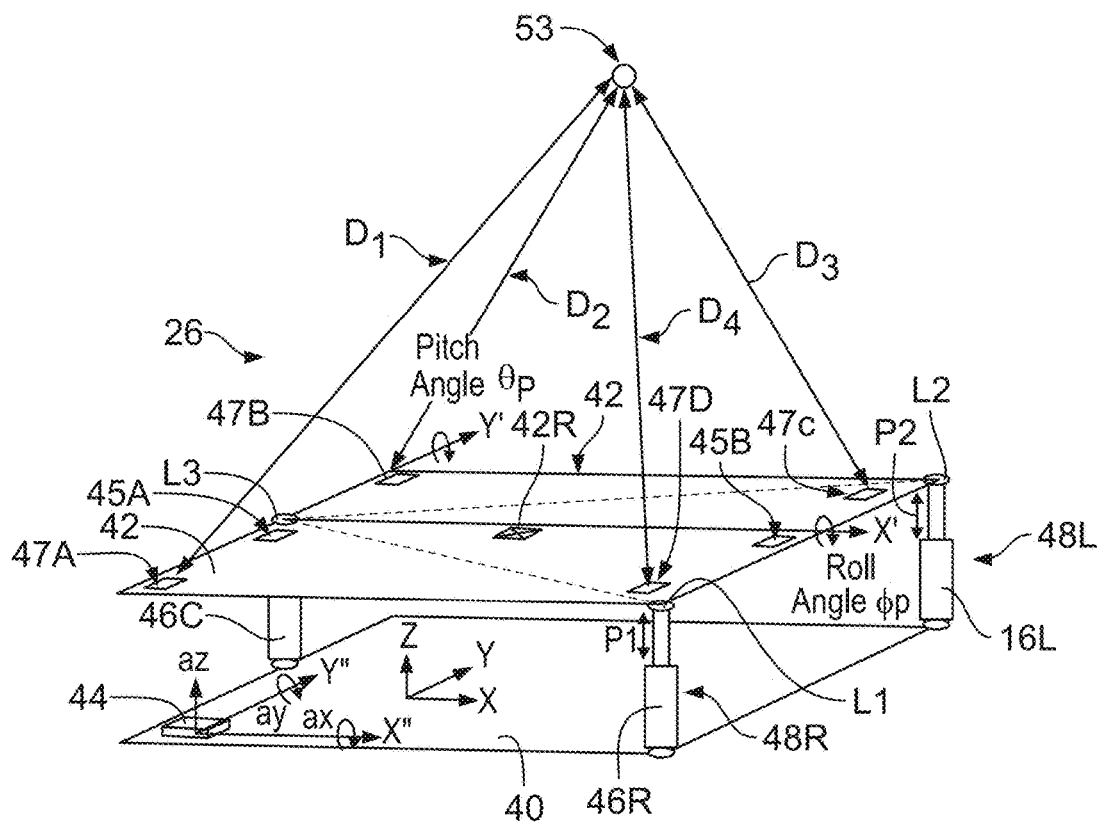
FIG. 5 is a schematic diagram of the aircraft platform illustrated in FIG. 1.

With reference to FIG. 5, the aircraft platform 26 of the utility task vehicle 10 is described in detail below. In the illustrated embodiment, the accelerometer 44 is fixedly mounted to the top surface (mount surface) of the base 40. The accelerometer 44 includes a three-axis accelerometer that detects accelerations along XYZ axes (i.e., accelerations ax, ay and az) on the base 40. In the illustrated embodiment, the X axis is parallel to the longitudinal center line of the utility task vehicle 10 on the top surface of the base 40, the Y axis extends laterally perpendicular to the X axis on the top surface of the base 40, and the Z axis extends perpendicular to the XY axes. Thus, in the illustrated embodiment, the accelerometer 44 outputs the accelerations along the XYZ axes to the controller 82, which can be converted to the inclination angles of the base 40 relative to a level ground or horizontal plane. Thus, in the illustrated embodiment, the accelerometer 44 detects the inclination angles of the base 40 relative to the level ground.

As mentioned above, the inclination of the landing pad 42 can be adjusted with respect to the base 40 by adjusting the lengths of the right and left support legs 46R and 46L. In the illustrated embodiment, the landing pad 42 is movable about the joint location L3 to change the inclination of the landing pad 42 relative to the base 40 and the level ground. For example, when one of the right and left support legs 46R and 46L is extended and the other one is contracted, then a roll angle of the landing pad 42 relative to the base 40 is changed. On the other hand, when the right and left support legs 46R and 46L are both extended or contracted, then a pitch angle relative to the base 40 is changed. In the illustrated embodiment, the roll angle of the landing pad 42 relative to the base 40 is an inclination (rotation) angle of the landing pad 42 about an X' axis that extends through the joint location L3 and is parallel to the X axis on the base 40. Also, the pitch angle of the landing pad 42 relative to the base 40 is an inclination (rotation) angle of the landing pad about a Y' axis that extends through the joint location L3 and is parallel to the Y axis on the base 40. Thus, the inclination of the landing pad 42 can be adjusted about two axes.

Figure 6A:
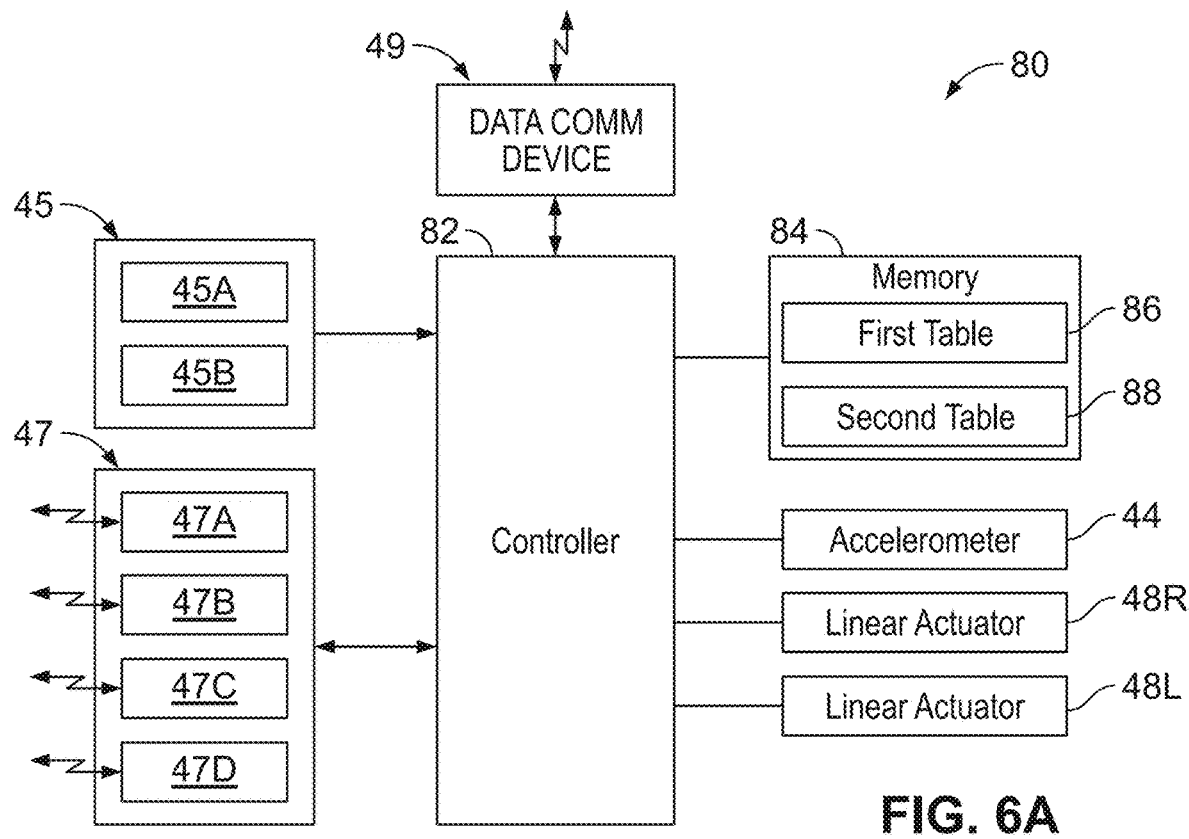
FIG. 6A is a block diagram of an aircraft platform control system of the aircraft platform illustrated in FIG. 1.

In the illustrated embodiment, as shown in FIG. 6A, the utility task vehicle 10 includes an aircraft platform control system 80 for controlling the aircraft platform 26. The aircraft platform control system 80 can include a controller 82 (e.g., an electronic controller), a memory 84 (e.g., a computer memory), the accelerometer 44, the linear actuators 48R and 48L.

As understood in the art, the controller 82 can include a microcomputer having one or more processors that execute one or more control programs for controlling the aircraft platform 26. The controller 82 can also include other conventional components such as an input interface circuit, an output interface circuit, and data/program storage devices such as a ROM (Read Only Memory) device and a RAM (Random Access Memory) device. The RAM and ROM store processing results and control programs that are run by the processor(s) of the controller 82. The controller 82 is operatively coupled to the components of the aircraft platform 26 as appropriate, in a conventional manner. It will be apparent to those skilled in the art from this disclosure that the precise structure and algorithms for the controller 82 can be any combination of hardware and software that will carry out the functions disclosed herein. Also, as understood in the art, the memory 84 is any computer storage device or any computer readable medium with the sole exception of a transitory, propagating signal. For example, the memory 84 can be nonvolatile memory and volatile memory, and can includes an internal memory, or other type of memory devices such as flash memory or hard drives with external high-speed interface such as a USB bus or a SATA bus.

As illustrated in FIG. 6A, the controller 82 is electrically connected to the memory 84, the accelerometer 44 and the linear actuators 48R and 48L to control the linear actuators 48R and 48L based on the output of the accelerometer 44.

Additionally, in some embodiments, the aircraft platform 26 can include a general position module 45 and a local position module 47, both of which can also be electrically connected to the controller 82, or in the form of independent modules, separate from the controller 82.

The general position module 45 can be configured to detect a general position and/or orientation of the aircraft platform 26 for transmission to the unmanned helicopter H, for example, during a landing operation. Additionally, the local position module 47 can be configured to provide signals useable by the unmanned helicopter H for more precise determination of local position and orientation of the unmanned helicopter H relative to the takeoff and landing pad 42, for example, a reference location or point 42R on an upper surface of the landing pad 42.

In some embodiments, the general position module 45 can include one or more general position devices 45A, 45B, which can be in form of location transducers, for example, transducers, configured for detecting a general location and orientation of the takeoff and landing pad 42. For example, in some embodiments, the general position devices 45A, 45B are two GPS units mounted at predetermined locations relative to the upper surface of the takeoff and landing pad 42. Operating under a conventional protocol, such general position devices 45A, 45B, for example, in the form of GPS units, can be used to generate two coordinate locations relative to a local coordinate system or a global positioning system coordinates. Thus, as used herein, the term "general position" can encompass global position coordinates. For example, the general position devices 45A, 45B can be operated so as to generate general location coordinates (e.g., X Y Z coordinates, such as the longitude, latitude and altitude). Using two sets of location coordinates from the general position devices 45A, 45B, optionally, a general location of the reference point 42R can also be calculated. Additionally, with the general position devices 45A, 45B located at predetermined locations on the takeoff and landing pad 42, a directional orientation of the upper surface of the landing pad 42 can also be determined. For example, using the two calculated positions of the general position devices 45A, 45B, it can be determined that the front of the takeoff and landing pad 42 is along a direction extending from the position of the general position device 45A toward the general position device 45B.

In other embodiments, the general position devices 45A, 45B can be in the form of one GPS unit and one compass, or other types of and combinations of devices can also be used.

In any such embodiments, the general position module 45 can be used to generate a coordinate location of the takeoff and landing pad 42 and/or a precise location of the reference point 42R on the upper surface of the landing pad 42, as well as an indication of a directional orientation of the upper surface of the takeoff and landing pad 42. In some modes of operation, for example, after the landing pad 42 has been leveled, the pitch ($\theta$) and roll ($\phi$) of the landing pad 42 would be zero or near zero and thus the landing pad 42 would be horizontal, close to horizontal, or substantially horizontal (e.g., within a few degrees of zero pitch ($\theta$) and zero roll ($\phi$)). The heading ($\Psi$) of the landing pad 42 can be derived from the relative positions of the general position devices 45A, 45B, an example determination of attitude is described below with reference to FIG. 6C.

The local position module 47 can include one or more local position devices configured to provide signals useable by the unmanned helicopter H for determining a position and/or orientation of the upper surface of the takeoff and landing pad 42 with a higher precision and accuracy than possible using the general position module 45, which may rely on GPS signals and/or compasses, or other general position determination devices.

The local position module 47 can include a plurality of distance transducers or beacons, configured to provide a signal useable by the unmanned helicopter H for determining a linear distance between predetermined locations on the upper surface of the takeoff and landing pad 42 to a reference location on the unmanned helicopter H. Using well-known calculations, a plurality of linear distances between multiple predetermined locations on the upper surface of the landing pad 42 and a reference position on the unmanned helicopter H can be used to determine, with higher precision and accuracy than that possible with some GPS systems alone, the position and/or orientation of the unmanned helicopter H relative to the position and orientation of the takeoff and landing pad 42.

In some embodiments, the local position module 47 includes at least three local position devices 47A, 47B, 47C, 47D, which can be in the form of linear distance beacons. Optionally, the unmanned helicopter H can include a local position sensor 53 configured to communicate with the local position module 47. With reference to FIG. 5, the local position devices 47A-47D can be provided at four predetermined locations relative to the upper surface of the takeoff and landing pad 42. In some embodiments, the local position devices 47A-47D can be in the form of "time of flight" (TOF) beacons also known as "anchors." In such embodiments, the local position sensor 53 on the unmanned helicopter H, can be a "tag". Other types of sensors can also be used. Such devices are commercially available from suppliers such as Pozyx® and VBOX Automotive™. In some embodiments, the local position devices 47A-47D are either mounted on top of the upper surface of the takeoff and landing pad 42, mounted into recesses (not shown) on the upper surface of the takeoff and landing pad 42, or are mounted below the upper surface of the takeoff and landing pad 42 but with wireless-signal-transparent material positioned directly above the anchors so as to prevent interference with the required signal transmission, described in greater detail below.

The local position devices 47A-47D can be used with different types of local position calculation hardware and configured for different principles of operation. For example, at least three of the local position devices 47A-47D can be used in accordance with a time of flight principle of operation, which is known in the art. The TOF principle of operation is a positioning method based on two-way ranging. Under this principle of operation, the local position devices 47A-47D, which can be in the form of "anchors" send and receive signals to and from the local position sensor 53, which can be in the form of a "tag", provided on the unmanned helicopter H (described in greater detail below), four times. The time of flight of the signal between the local position devices 47A-47D and the local position sensor 53 is measured. These signals are in the form of radio waves, traveling at the speed of light and is thus used to calculate the distance between the local position sensor 53 and each of the local position devices 47A-47D.

Under this principle of operation, the local position sensor 53 sends a poll packet and records Timestamps, which is recorded as Tsp (Time start poll). Each of the local position devices 47A-47D receives the poll packet and records the Trp (Time receive poll). Each of the local position devices 47A-47D then spends some time receiving signal and generating a Response packet, which named as Trsp. Each of the local position devices 47A-47D then sends the Response message, and records Tsr (Time start response). The local position sensor 53 receives the Response message, and records the Trr (Time receive response). The local position sensor 53 then spends time receiving signal and generating Final message, which named as Trsp. The local position sensor 53 then sends Final message, and record Tsf (Time start final). The local position devices 47A-47D then receive a final message, and records Trf (Time receive final).

After the above process, each of the local position devices 47A-47D will have all the timestamp information, including: Tsp, Trp, Tsr, Trr, Tsf, Trf.

R (distance or "range" between one anchor and the tag)={(Trr−Tsp)−(Tsr−Trp)+(Trf−Tsr)−(Tsf−Trr)}/4. Tsr−Trp=Trsp, Tsf−Trr=Trsp.

With the TOF method, the local position sensor 53 should complete the ranging with each of the local position devices, in the illustrated embodiment, 47A, 47B, 47C could be used as 3 anchors. After the tag and at least 3 anchors complete the ranging, there will be 3 corresponding distances, namely D1~D3. Using the known locations of each of the local position devices 47A, 47B, 47C as center point, and D1-D3 as 3 radii, 3 circles or spheres can be drawn. Three circles would intersect at one point, which would be the calculated position of the tag in a two dimensional scheme. In a three dimensional scheme, such as during flight of the unmanned helicopter H, where three spheres are drawn, the three spheres intersect at two points, one point being at a location above the landing pad 42, and one point being below the upper surface of the landing pad 42. Thus, during operation, resulting points of intersection that are below the upper surface of the landing pad 42, can be ignored and points of intersection calculated as being above the upper surface of the landing pad 42 can be used for landing mode operation, described in greater detail below. This process can be referred to as trilateration; a process of determining absolute or relative location of points by measurement of distances, using the geometry of circles, spheres, or triangles.

In a two-dimensional mode, two anchors can be used for ranging to determine the location of the tag 53. For a three-dimensional mode, three anchors can be used. However, in practice, where three-dimensional coordinates are desired, it is common to use four (4) anchors. Thus, in the illustrated embodiment, local position devices 47A-47D can be used to determine the distances D1-D4, which can then be used to determine a vector extending between a point on the landing pad 42 to the tag 53, for example, in a frame based on the directions of the landing pad, i.e., a landing pad frame vector, described in greater detail below.

In other embodiments, the local position module 47 is configured to operate according to the time difference of arrival (TDOA) principle of operation. Some commercial systems operate with three anchors and others operate with a minimum of four anchors.

TDOA is localization based on comparing the time difference between signals and each of the local position devices 47A-4D. This technique requires an accurate time synchronization function. When using the TDOA method, the local position sensor 53 will send out a poll message and all the nearby local position devices 47A-47D will receive it and record the arrival time. Because the location of local position devices 47A-47D is different, anchors will not receive the poll message at the same time. These time differences are used to determine the location of the tag 53.

Under this principle of operation, the local position sensor 53 sends a poll message, and each of the local position devices 47A-47D receives and records the timestamp. A designated master anchor sends a sync message, and any designated slaver anchors receive and perform synchronization processing.

When the local position sensor 53 completes communication with three anchors, there will be three corresponding different arrival times (T1~T3) and with those, time differences can be calculated. With that, distance differences between the signal source and each anchor can be calculated. In this type of system, the distance difference between the tag and two anchors is a constant. Thus, hyperbolas are drawn, the intersection of which are used to find the location of the tag 53. Under this principle of operation, all anchors are in sync. There are two kinds of time synchronization including wired and wireless methods.

When finishing the time synchronization, the local position sensor 53 sends a broadcast message, and all the local position devices 47A-47D send the timestamp of receiving this message to a server, and the server will calculate the location of the tag 53. In the illustrated embodiment, the controller 82 can be used for calculating the location of the tag. In other embodiments, a flight controller on the unmanned helicopter H (described in greater detail below) can be used for calculating the location of the tag 53.

In other embodiments, at least a plurality of the local position devices 47A-47D can be configured for use under the phase difference of arrival (PDOA) principle of operation. In other embodiments, three or more of the local position devices 47A-47D and the local position sensor 53 can be configured for use under the phase difference of arrival (PDOA) principle of operation. Yet, in other embodiments, three or more of the local position devices 47A-47D and the local position sensor 53 can be configured for operation under a magnetic field positioning system principle of operation.

Under the magnetic field positioning system principle of operation, such as those referred to as Magnetic Indoor Positioning Systems (MILPS), quasi static magnetic fields can be used for detecting 3-D positions of moving objects. For example, with some known systems, alternating DC magnetic signals are generated at each reference station, for example, with three or more of the local position devices 47A-47D. The subject of position tracking, in the present embodiment, the unmanned helicopter H, is provided with a magnetic field sensor. Thus, the local position sensor 53, in the present embodiment, can be in the form of a magnetic field sensor. During operation, the magnetic field sensor can be used to detect the strength of the field created by the local position devices 47A-47D. The 3-D position of the local position sensor 53 relative to the local position devices 47A-47D can then be determined using the trilateration principle, noted above. This position can be expressed as a vector in the landing pad frame, extending between one of the local position devices 47A-47C, and the local position sensor 53, relative to the directions (X=forward, Y=left, Z=up) of the landing pad 42. An example of such a vector is illustrated in FIG. 6B as vector $D^L$, extending from device 47C to the local position sensor 53.

With continued reference to FIG. 6A, the controller 82 can include a data communication device 49 configured for transmitting and receiving data for communication with various devices, including the unmanned helicopter H as well as a user device (described in greater detail below). The operation of the general position module 45 and the local position module 47 is further described below with reference to FIGS. 14-19.

Figure 6B:
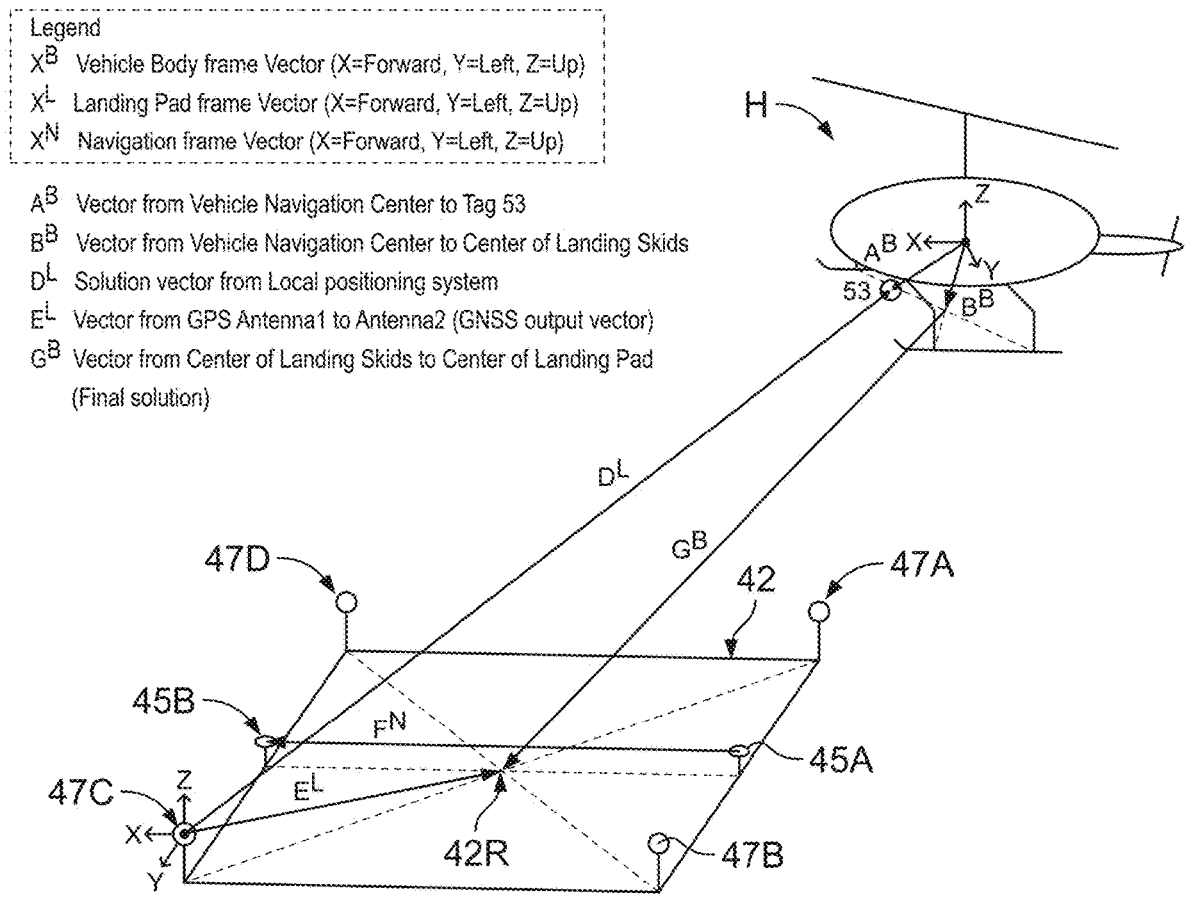
FIG. 6B is a schematic diagram illustrating a vector-based determination of a landing vector for landing the aircraft on the aircraft platform.
Figure 6C:
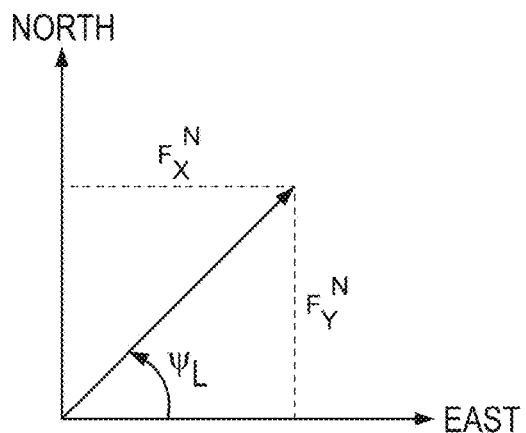
FIG. 6C is a schematic diagram illustrating a determination of a heading ($\Psi$) of the landing platform as well as a direction cosine matrix for transformation from a landing pad frame vector to a navigation frame vector.
Figure 7:
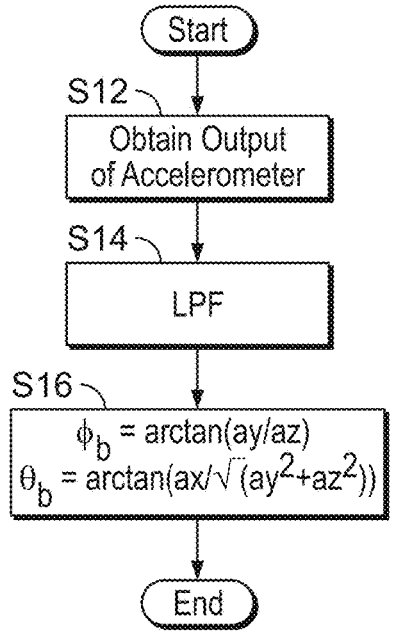
FIG. 7 is a flowchart for detecting an inclination angle of a base of the aircraft platform illustrated in FIG. 1.

With reference to FIGS. 6B and 6C, in some modes of operation, the unmanned helicopter H will takeoff from and land on the landing pad 42 in a horizontal orientation, for example, following the leveling operations described below with reference to FIGS. 7-9. FIG. 6B is a vector diagram illustrating an optional technique for resolving the relative position and orientation of the unmanned helicopter H relative to the landing pad 42. In illustrated embodiment, three frames are identified for determining the landing vector $G^B$ from the local position vector $D_L$ and the landing pad orientation vector $F^N$.

As reflected in the legend of FIG. 6B, vectors in the form of $X^B$ are based on the vehicle body frame (X=forward, Y=left, Z=up) relative to the body of the unmanned helicopter H. Vectors in the form of $X^L$ are based on the landing pad frame (X=forward, Y=left, Z=up) relative to the landing pad 42. Vectors in the form of $X^N$ are based on the navigation frame (X=East, Y=North, Z=up) i.e., relative to compass headings. The legend also identifies additional vectors can optionally be used for determining the landing vector $G^B$ from the local position vector $D^L$ and the landing pad orientation vector $F^N$, for convenience, all of the vectors in FIG. 6B are listed below:

$A^B$: Vector (vehicle body frame $X^B$) from the vehicle navigation center to the local position sensor 53. In some embodiments, the navigation center can be the position of a GPS unit or other fixed reference position on the unmanned helicopter H.

$B^B$: Vector (vehicle body frame $X^B$) from the vehicle navigation center to a vehicle landing reference point which would be adjacent to or coincident with the reference point 42R when the unmanned helicopter is at rest in a landing position on the landing pad 42. In the illustrated embodiment, the vehicle landing reference point is disposed between and aligned with the lower surface of the skis of the unmanned helicopter H.

$D^L$: Vector (landing pad frame $X^L$) derived from the result of the local positioning system described above.

$E^L$: Vector (landing pad frame $X^L$) from a predetermined local positioning system reference point, such as the location of any one of the local position devices 47A-47D, to the desired reference landing point 42R.

$F^N$: Vector (navigation frame $X^N$) of the landing pad orientation extending from a rear edge to a forward edge of the landing pad, e.g., from device 45A to device 45B, based on general position data, such as, for example, but without limitation, two GPS and/or GNSS positions determined by devices 45A, 45B.

$G^B$: Vector from the vehicle reference landing point (e.g., between the skiis of the unmanned helicopter H) to the landing reference point 42R on the landing pad 42. This vector can serve as a solution vector for use by the unmanned helicopter to land on the landing pad 42 in the desired orientation.

With the vectors defines as above, the direction cosine matrix for transforming vectors between the vehicle body vector frame $X^B$ and the navigation vector frame $X^N$ would be defined as follows:

$$C_\phi = \begin{pmatrix} 1 & 0 & 0 \\ 0 & \cos\phi & -\sin\phi \\ 0 & \sin\phi & \cos\phi \end{pmatrix} \text{ROLL ANGLE}$$

$$C_\theta = \begin{pmatrix} \cos\theta & 0 & \sin\theta \\ 0 & 1 & 0 \\ -\sin\theta & 0 & \cos\theta \end{pmatrix} \text{PITCH ANGLE}$$

$$C_\psi = \begin{pmatrix} \cos\psi & -\sin\psi & 0 \\ \sin\psi & \cos\psi & 0 \\ 0 & 0 & 1 \end{pmatrix} \text{YAW(HEADING) ANGLE}$$

$$\begin{pmatrix} \text{east} \\ \text{north} \\ \text{up} \end{pmatrix}^N = C_\psi C_\theta C_\phi \begin{pmatrix} \text{forward} \\ \text{left} \\ \text{up} \end{pmatrix}^B$$

$$\begin{pmatrix} \text{east} \\ \text{north} \\ \text{up} \end{pmatrix}^N = C_B^N \begin{pmatrix} \text{forward} \\ \text{left} \\ \text{up} \end{pmatrix}^B$$

$$C_B^N = \begin{pmatrix} \cos\psi\cos\theta & \sin\phi\cos\psi\sin\theta - \cos\phi\sin\psi & \cos\phi\cos\psi\sin\theta + \sin\phi\sin\psi \\ \sin\psi\cos\theta & \sin\phi\sin\psi\sin\theta + \cos\phi\cos\psi & \cos\phi\sin\psi\sin\theta - \sin\phi\cos\psi \\ -\sin\theta & \sin\phi\cos\theta & \cos\phi\cos\theta \end{pmatrix}$$

$$C_N^B = \begin{pmatrix} \cos\psi\cos\theta & \sin\psi\cos\theta & -\sin\theta \\ \sin\phi\cos\psi\sin\theta - \cos\phi\sin\psi & \sin\phi\sin\psi\sin\theta + \cos\phi\cos\psi & \sin\phi\cos\theta \\ \cos\phi\cos\psi\sin\theta + \sin\phi\sin\psi & \cos\phi\sin\psi\sin\theta - \sin\phi\cos\psi & \cos\phi\cos\theta \end{pmatrix}$$

FIG. 6C reflects a mode of operation in which the platform 42 is horizontal and thus the pitch ($\theta$) and roll ($\phi$) both equal zero. The heading ($\Psi$) can be determined based on the output of the general position devices 45A and 45B. In the illustrated mode of operation, the landing pad vector $F^N$ extends from the first device 45A to the second device 45B. The resulting landing pad vector $F^N$ lies in a horizontal plane, with x-y components $F_x^N$ and $F_y^N$. Thus, in some embodiments, the controller 82 can be configured to detect an heading ($\Psi$) of the landing pad 42 based on the output from the general position devices 45A and 45B and output attitude data indicative of the detected heading ($\Psi$). The attitude data can include one or more aspects of the attitude of the landing pad 42, such as one or more or heading (yaw), pitch, and roll. Here the heading data is heading data, such data can be in in the form of the landing pad vector $F^N$, a compass heading, or other data indicative of the detected heading ($\Psi$) of the landing pad 42. The controller 82 can also be configured to output heading ($\Psi$) data to the unmanned helicopter H, for example, by way of the data communication device 49. The Direction Cosine Matrix for transforming a vector from a landing pad frame vector $X^L$ to a navigation frame vector $X^N$, where the landing pad 42 is or is assumed to be horizontal, can be defined as follows:

$\phi_L=0$ $C^N{}_L\theta_L=0$ $\psi_L=\arc\tan(F_x^N/F_y^N)$

The vector $D^L$ can be generated by the results of trilateration described above, using the local position module 47. Because the relative positions of all of the local position devices 47A-47D are fixed, the vector $D^L$ can be resolved as a vector extending from any one of the position devices 47A-47D, to the local position sensor 53. In the illustrated embodiment, the vector $D^L$ extends from the location device 47C to the local position sensor 53 on the unmanned helicopter H.

Thus, the landing vector $G^B$ can be determined with the following operations:

$A^N = C^N{}_B A^B$ $B^N = C^N{}_B B^B$ $$D^N = C^N_L D^L$$

$$E^N = C^N_L E^L$$

$$G^N = -A^N + B^N + D^N - E^N$$

$$G^B = \text{transpose}(C^N_B) G^N = C^B_N G^N$$

The above described embodiment for determining the landing vector $G^B$, is described in the context of the landing pad 42 being horizontal. However, in other modes of operation, the landing pad 42 can be non-horizontal.

Where it is desired to have the landing pad 42 horizontal, close to horizontal, or substantially horizontal (e.g., within a few degrees of zero pitch ($\theta$) and zero roll ($\phi$)), a leveling operation can be used. For example, with reference to FIG. 7, the controller 82 first calculates the inclination angle of the base 40 relative to the level ground. For example, the controller 82 obtains the output of the accelerometer 44 while the utility task vehicle 10 is in a stationary state relative to the ground (step S12). The controller 82 further removes noise components in the output of the accelerometer 44 using a low-pass filter (LPF) to obtain the accelerations ax, ay and az (step S14). Furthermore, the controller 82 calculates the inclination angle of the base 40 relative to the level ground based on the accelerations ax, ay and az (step S16). In particular, the controller 82 calculates a roll angle $\phi$b and a pitch angle $\theta$b of the base 40 relative to the level ground while the utility task vehicle 10 is in the stationary state relative to the ground as follows:

$\phi$b=arctan(ay/az); and $\theta$b=-arctan(ax/$\sqrt{}$(ay 2+az 2)).

In the illustrated embodiment, the roll angle $\phi$b of the base 40 is an inclination (rotation) angle of the base 40 about an X" axis that extends through the mount location of the accelerometer 44 on the base 40 and is parallel to a projection line of the longitudinal center line of the utility task vehicle 10 onto the level ground. Also, the pitch angle Ob of the base 40 is an inclination (rotation) angle of the base 40 about a Y" axis that extends through the mount location of the accelerometer 44 and is parallel to a line that is perpendicular to the projection line of the longitudinal center line on the level ground.

Figure 8:
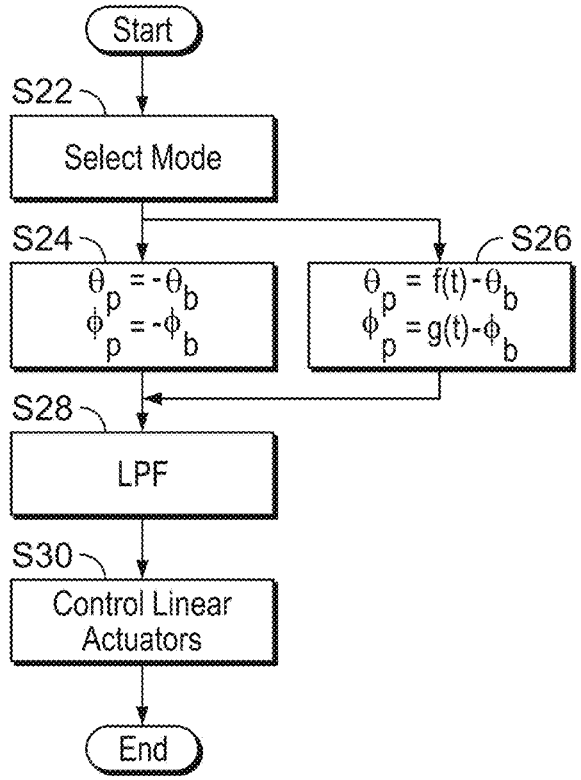
FIG. 8 is a flowchart for controlling the aircraft platform illustrated in FIG. 1.

As illustrated in FIG. 8, the controller 82 is programmed to control the linear actuators 48R and 48L to change the inclination of the landing pad 42. For example, the controller 82 first selects an operation mode of the aircraft platform 26 between a takeoff and landing mode and an INS (Inertial Navigation System) convergence assisting mode (step S22). In the illustrated embodiment, the operation mode of the aircraft platform 26 is manually selected by a user input.

The takeoff and landing mode of the aircraft platform 26 is a mode in which the controller 82 controls the linear actuators 48R and 48L to level the landing pad 42 based on the inclination angle of the base 40 as detected by the accelerometer 44. For example, in the takeoff and landing mode, the controller 82 levels the landing pad 42 for preparing the landing of the unmanned helicopter H while the unmanned helicopter H is not located on the landing pad 42. Of course, in the takeoff and landing mode, the controller 82 can also level the landing pad 42 for preparing the takeoff of the unmanned helicopter H while the unmanned helicopter H is located on the landing pad 42.

The controller can also be configured to operate in an INS convergence assisting mode of the aircraft platform 26, in which the controller 82 controls the linear actuators 48R and 48L to change the inclination of the landing pad 42 within a predetermined range based on the inclination angle of the base 40 as detected by the accelerometer 44. The details of the hardware and methods of operation are disclosed in U.S. Patent Publication No. 2019/0276162 and are hereby expressly incorporated by reference.

When the takeoff and landing mode is selected in step S22, then the controller 82 calculates a target value of the roll angle (target roll angle $\phi$p) of the landing pad 42 relative to the base 40 and a target value of the pitch angle (target pitch angle $\theta$p) of the landing pad 42 relative to the base 40 as follows (step S24):

$\theta$p=-$\theta$b; and $\phi$p=-$\phi$b where $\phi$b represents the roll angle of the base 40 relative to the level ground, and $\theta$b represents the pitch angle of the base 40 relative to the level ground.

The controller 82 further applies a low-pass filter (LPF) to the target roll angle $\phi$p and the target pitch angle $\theta$p that have been obtained in steps S24 and S26 to remove step changes upon switching the operation mode in step S22 (step S28). In the illustrated embodiment, the LPF has a time constant of 5 seconds, for example.

The controller 82 further controls the linear actuators 48R and 48L based on the target roll angle $\phi$p and the target pitch angle $\theta$p of the landing pad 42 (step S30).

Figure 9:
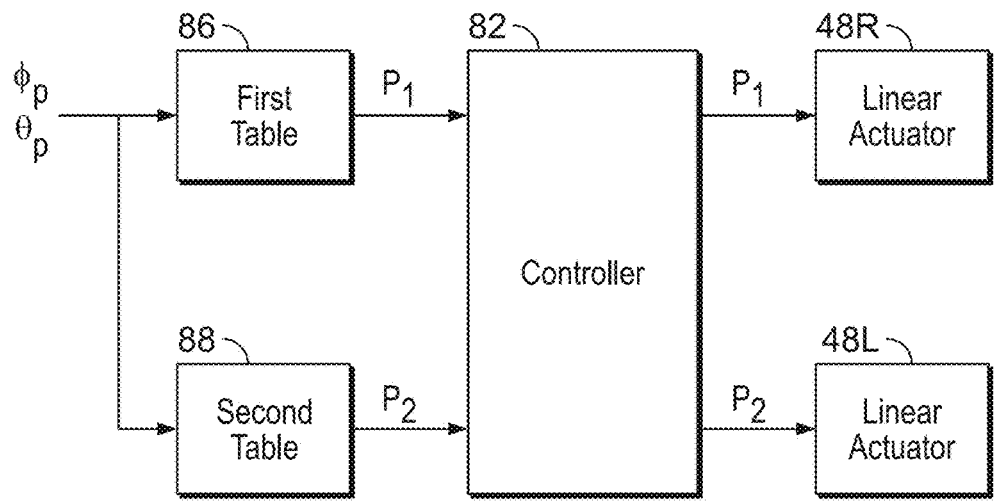
FIG. 9 is a schematic diagram illustrating a process for obtaining control amounts of the linear actuators.

As illustrated in FIG. 9, the controller 82 refers to the first and second tables 86 and 88 to obtain first and second target positions P1 and P2 of the linear actuators 48R and 48L (see FIG. 5) based on the target roll angle $\phi$p and the target pitch angle $\theta$p of the landing pad 42. For example, in the illustrated embodiment, the first table 86 includes a lookup table that stores a plurality of the first target positions P1 of the linear actuator 48R in association with a plurality of combinations of target roll angles $\phi$p and target pitch angles $\theta$p of the landing pad 42. Also, the second table 88 includes a lookup table that stores a plurality of the second target positions P2 of the linear actuator 48L in association with a plurality of combinations of target roll angles $\phi$p and target pitch angles $\theta$p of the landing pad 42. The first and second target positions P1 and P2 of the linear actuators 48R and 48L are calculated in advance so as to achieve the target roll angles $\phi$p and the target pitch angles $\theta$p of the landing pad 42, and are stored in the first and second tables 86 and 88, respectively, in association with the target roll angles $\phi$p and the target pitch angles $\theta$p. For example, the first and second target positions P1 and P2 are calculated in advance based on the distances between the joint locations L1, L2 and L3, the adjustable ranges of the linear actuators 48R and 48L, and the linearity of the linear actuators 48R and 48L.

As illustrated in FIG. 9, the controller 82 further controls the linear actuators 48R and 48L to adjust the linear actuators 48R and 48L to the first and second target positions P1 and P2, respectively. This operation changes an actual roll angle of the landing pad 42 and an actual pitch angle of the landing pad 42 to the target roll angle $\phi$p and the target pitch angle $\theta$p, respectively. For example, in the takeoff and landing mode, the actual roll angle and the actual pitch angle of the landing pad 42 is leveled relative to the level ground.

In the illustrated embodiment, the utility task vehicle 10 has an elevated platform relative to the ground. For example, in the illustrated embodiment, the landing pad 42 is located even with, above the top of the roll cage 14 or on top of the roll cage 14. Thus, an amount of dust and/or debris blown into the air from the ground due to helicopter downwash of the unmanned helicopter H at takeoffs and landings of the unmanned helicopter H is greatly reduced or eliminated, thereby reducing or preventing damage.

In the illustrated embodiment, the utility task vehicle 10 has the aircraft platform 26 with the landing pad 42. The aircraft platform control system 80 can adjust the inclination of the landing pad 42 using the linear actuators 48R and 48L. For example, in the takeoff and landing mode of the aircraft platform 26, the aircraft platform control system 80 can adjust the landing pad 42 to level the landing pad 42. Thus, even if the utility task vehicle 10 is used over an undulating or uneven fields, such as a vineyard, the landing pad 42 can be leveled, which is suitable for takeoff and landing of the unmanned helicopter H.

In the illustrated embodiment, the first and second target positions P1 and P2 of the linear actuators 48R and 48L are obtained based on the first and second tables 86 and 88. However, the present inventions are not limited to this configuration. The controller 82 can compute the first and second target positions P1 and P2 of the linear actuators 48R and 48L based on the target roll angles φp and target pitch angles θp using predetermined formulas.

In the illustrated embodiment, the accelerometer 44 is mounted on the base 40. However, the present inventions are not limited to this configuration. The accelerometer 44 can be mounted on the landing pad 42 (or 42') to directly detect the inclination of the landing pad 42. In this case, the controller 82 controls the linear actuators 48R and 48L to level (for the takeoff and landing mode) or to periodically move (for the INS convergence assisting mode) the landing pad 42 based on the detected roll angles and the detected pitch angles of the landing pad 42.

In the illustrated embodiment, two linear actuators 48R and 48L are connected to the landing pad 42 to change the inclination of the landing pad 42. However, the present inventions are not limited to this configuration. The aircraft platform 26 can include just one linear actuator or more than two linear actuators to change the inclination of the landing pad 42. In this case, the aircraft platform 26 can be configured such that only one of the support legs 46R, 46L and 46C is adjustable in height, or such that all of the support legs 46R, 46L and 46C is adjustable in height.

In the illustrated embodiment, the aircraft platform 26 has three support legs 46R, 46L and 46C. However, the present inventions are not limited to this configuration. The aircraft platform 26 can have four or more support legs. Also, the aircraft platform 26 can have less than three support legs.

Figure 10:
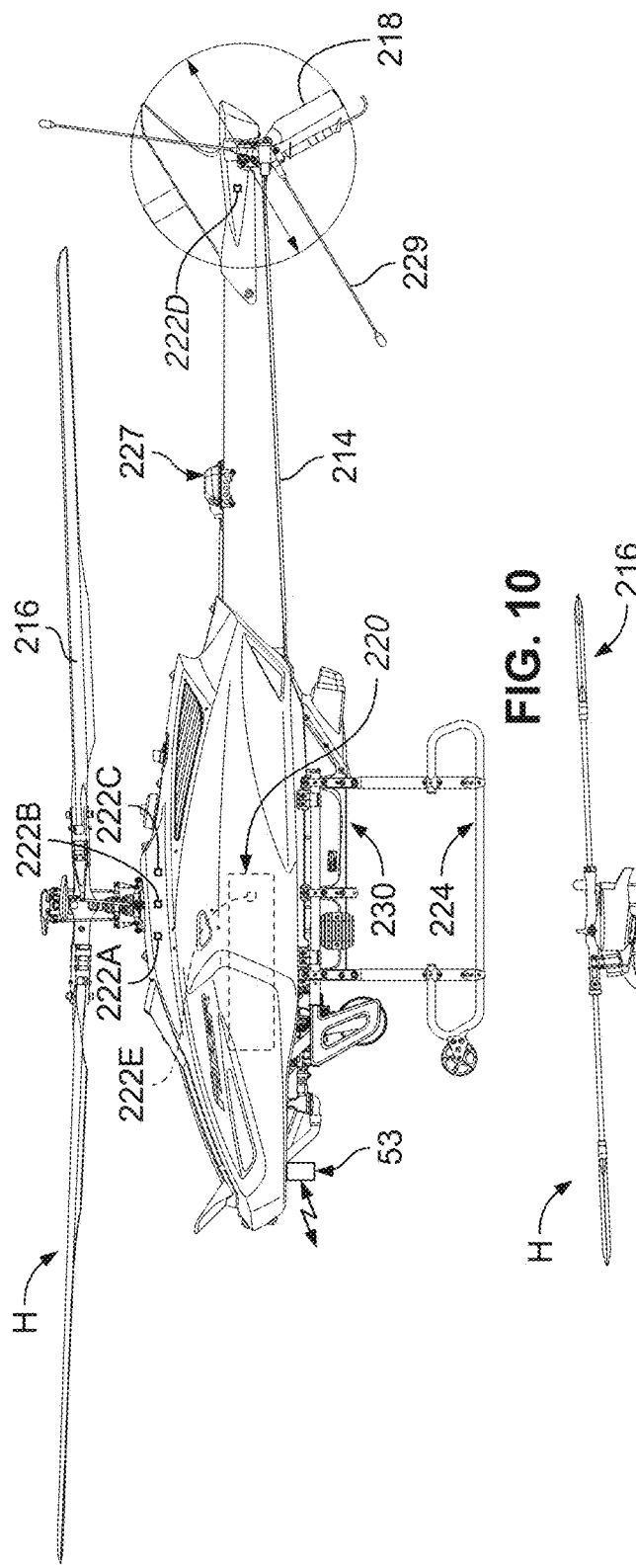
FIG. 10 is an enlarged, schematic, side elevational view of an unmanned helicopter in accordance with an embodiment, that can be used in conjunction with the embodiments of FIGS. 1-9.
Figure 11:
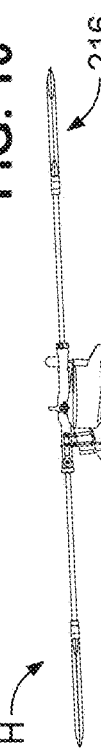
FIG. 11 is a schematic, front elevational view of the unmanned helicopter of FIG. 10.

Referring to FIG. 10, the unmanned helicopter H (e.g., an aircraft) is illustrated in accordance with an embodiment, including an automatic landing mode incorporating a local positioning system. The unmanned helicopter H can also be configured to fly over ground within a prescribed flight area to spray agricultural materials, such as chemicals, fertilizers and seeds, for crops. The unmanned helicopter H can have autopilot functions, such as, for example, but without limitation, a terrain following function that performs a terrain following control (described later) to maintain the altitude of the unmanned helicopter H relative to a surface of the ground at a predetermined target altitude Sz (e.g., a target altitude). In some embodiments, the predetermined target altitude Sz can be set to 3 meters, for example. However, the predetermined target altitude Sz can be set to different value, as needed and/or desired.

The unmanned helicopter H can also be used for a wide range of industrial application other than the agricultural uses. Also, the inventions disclosed herein can be incorporated into other to aircraft and other vehicles. The unmanned helicopter H generally has similar physical components to a manned helicopter, except for the absence of the cockpit area, windows, and size. Also, the unmanned helicopter H has a different control systems than that of a manned helicopter, for example, servos are connected directly to certain components without the need for additional linkages to user-input devices such as a collective and a control stick normally found in a manned helicopter.

As illustrated in FIG. 10, the unmanned helicopter H includes a main body 212 and a tail body 214. The tail body 214 is coupled to a rear end of the main body 212. The unmanned helicopter H also includes a main rotor 216 rotatably provided at an upper part of the main body 212 and a tail rotor 218 rotatably provided at a rear part of the tail body 214. In the illustrated embodiment, the unmanned helicopter H is a rotorcraft with a single main rotor. However, the unmanned helicopter H can be a rotorcraft with more than two main rotors. The unmanned helicopter H can be considered as a vertical takeoff and landing aircraft. However, the inventions disclosed herein can be used with other types of vertical landing aircraft, or other types of non-vertical and/or takeoff aircraft.

The unmanned helicopter H can have conventional physical configurations. For example, the unmanned helicopter H has an internal combustion engine 220 (hereinafter "the engine 220"), an intake system, an exhaust system and a fuel tank within the main body 212. Also, the unmanned helicopter H has a plurality of (five in this embodiment) servos 222 (see FIG. 3), with three of them connected to a swash-plate assembly 221 via linkages to change the pitch (angle) of main blades of the main rotor 16 (i.e., an aileron servo 222A, an elevator servo 222B and a pitch servo 222C), one of them connected to tail blades of the tail rotor 218 via a linkage to change the pitch (angle) of the tail blades of the tail rotor 218 (i.e., a rudder servo 222D) and one of them connected to the engine 220 via a linkage to control the throttle of the engine 220 (i.e., throttle servo 222E).

Figure 12:
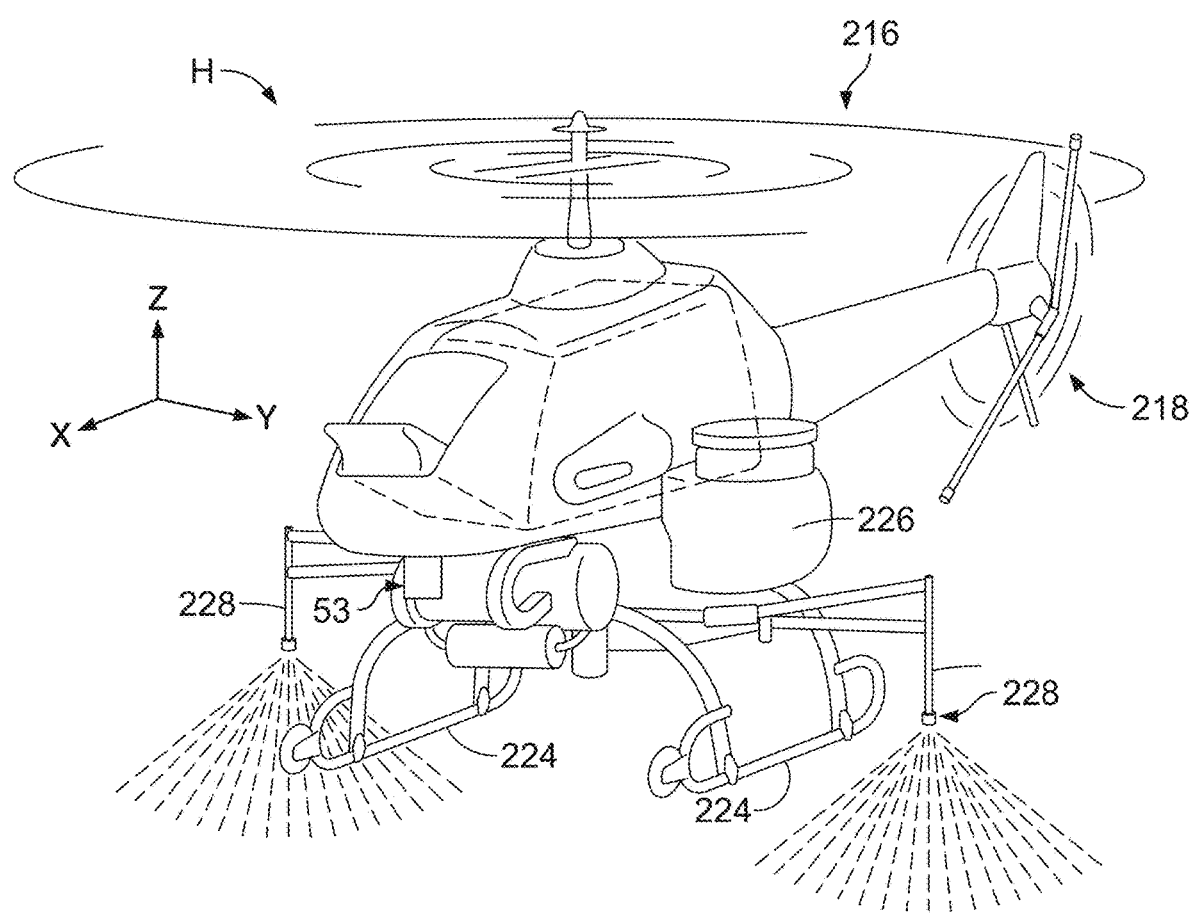
FIG. 12 is a schematic, perspective view of the unmanned helicopter illustrated in FIG. 10 with an optional chemical delivery system.

The unmanned helicopter H can also have a pair of skids 224 provided via support legs at the left and right sides of the main body 212. Also, in some variations, as illustrated in FIG. 12, the unmanned helicopter H has a pair of cassette-style liquid tanks 226 (e.g., one or more crop dusting tanks) and a pair of spray nozzles 228 fluidly connected to the liquid tanks 226. The liquid tanks 226 hold the agricultural material, such as chemicals, fertilizers and the like, for crops. The spray nozzles 228 spray the agricultural material. Of course, instead of the liquid tanks 226 and the spray nozzles 228, the unmanned helicopter H can have other equipment for agricultural application, such as a granular sprayer for spraying seeds, or other equipment for industrial application, such as various sensors and detectors. Also, in the illustrated embodiment, the unmanned helicopter H includes the engine 220. Of course, instead of the engine 220, the unmanned helicopter H can have another type of a prime mover, such as an electric motor. The unmanned helicopter H can also include various conventional components.

These physical configurations of the unmanned helicopter H are relatively conventional, and thus will not be described in detail for the sake of brevity.

With continued reference to FIG. 10, the unmanned helicopter also includes a main GPS antenna 225 and a sub-GPS antenna 227 provided on the upper surface of the tail body 214. Additionally, a remote control receiving antennae 229 can be provided on the rear end of the tail body 214 and configured for receiving command signals from a remote controller. The unmanned helicopter can also include a local position transducer configured for higher precision and accuracy position determination, for example, during a landing procedure. The local position sensor 53 can be configured for sending and/or receiving signals useful for determining a closer range, relative local position relative to a predetermined landing zone, such as, for example, the aircraft landing platform 26 described above with reference to FIGS. 5-9. For example, the local position sensor 53 can be configured as a "tag" or an "anchor" to transmit and/or receive signals useable for determining a distance, position, and/or orientation of the unmanned helicopter H relative to the takeoff and landing pad 42 (FIG. 5) and/or relative to a reference position 42R on an upper surface of the takeoff and landing pad 42.

In some embodiments, the local position sensor 53 is in the form of a "tag" configured for operation under the time of flight (TOF), time delay of arrival (TDOA), or the phase difference of arrival (PDOA) principles of operation. For example, in some embodiments, the local position sensor 53 is configured to communicate in one way or two way communication with anchors 47A-47D (FIGS. 5 and 6). These principles of operation are set forth above with reference to FIGS. 5 and 6, and thus can be applied to operation with the local position sensor 53 serving as the "tag," and thus is not repeated here. In other embodiments, the local position sensor 53 is in the form of an "anchor" and one of the devices 47A-47D is a "tag", the remaining devices being "anchors".

Figure 13:
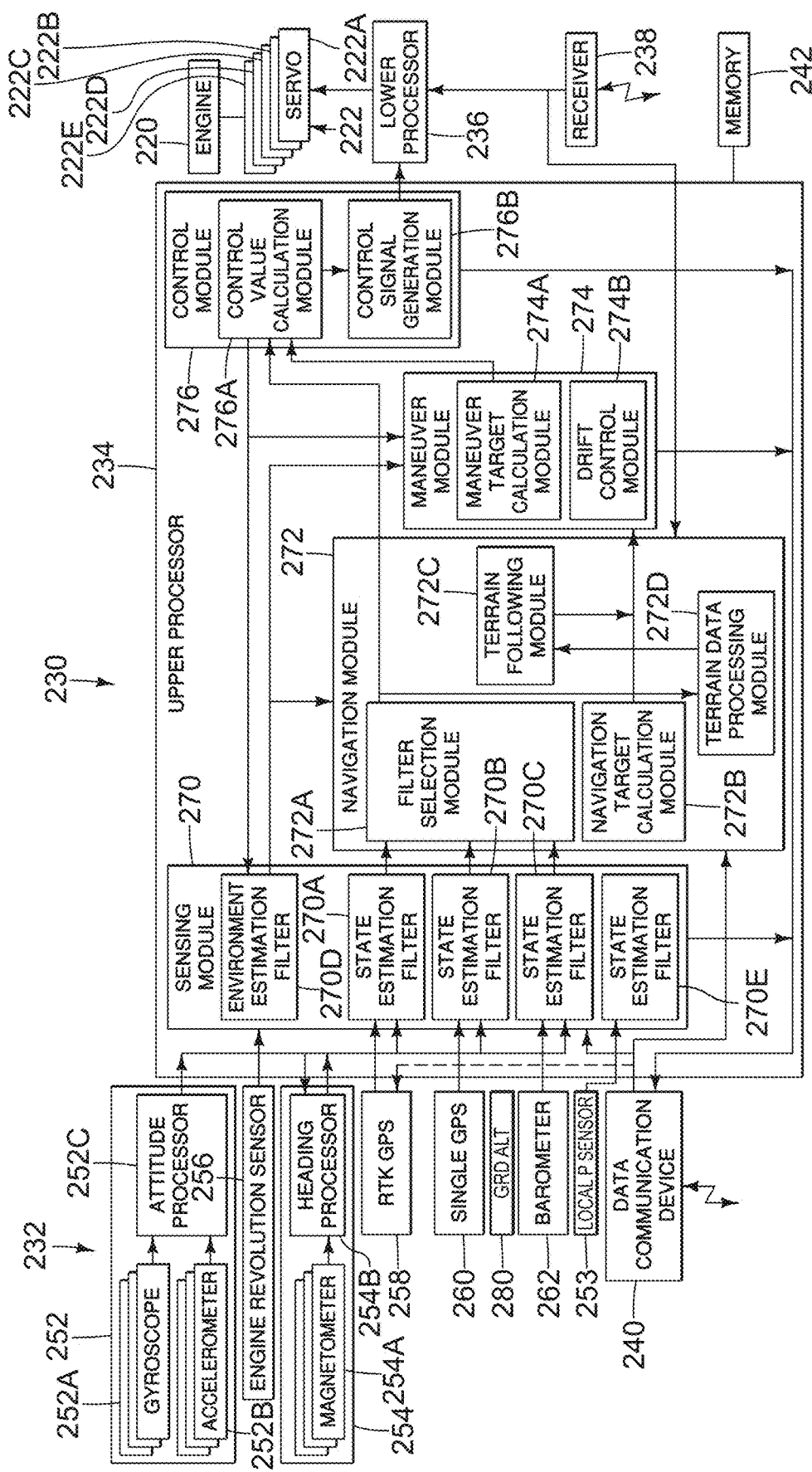
FIG. 13 is a block diagram of a flight control system of the unmanned helicopter illustrated in FIG. 1, including a local navigation, auto landing system.

Referring now to FIG. 13, a flight control system 230 of the unmanned helicopter H is described. For example, the flight control system 230 includes a plurality of sensors 232, an upper processor 234 (e.g., electronic controller), a lower processor 236 (e.g., electronic controller), a wireless receiver 238 (e.g., a wireless communication device), a data communication device 240 and a computer memory 242 (e.g., a data storage device or memory device). In the illustrated embodiment, the various components of the flight control system 230 are provided on the main body 212 or the tail body 214 in a conventional manner.

In the illustrated embodiment, the unmanned helicopter H can fly using a manual remote control or an autonomous control. For example, with the manual remote control, the receiver 238 receives radio signals (e.g., manual control command signals) from a remote controller or wireless transmitter (not shown) that is operated by an operator, and outputs control signals to the servos 222 via the lower processor 236 according to the radio signals. The manual remote control of the unmanned helicopter H is relatively conventional, and thus, the manual remote control will not be described in detail. With the autonomous control, the upper processor 234 acquires sensing data from the sensors 232 and input data from the data communication device 240 that wirelessly communicates with a ground station (not shown). The upper processor 234 processes the data according to a control program prescribed in advance to output control signals to the servos 222 via the lower processor 236. The lower processor 236 select a control mode of the unmanned helicopter H between the manual remote control and the autonomous control according to a manual selection performed on the remote controller, or a radio reception status between the wireless receiver 238 and the remote controller, and the like.

In the illustrated embodiment, with the autonomous control, the unmanned helicopter H flies over the ground along a predetermined flight path while maintaining the altitude of the unmanned helicopter H relative to the ground at the predetermined target altitude Sz (i.e., the terrain following control). The predetermined flight path of the unmanned helicopter H is set over the prescribed flight area so that the unmanned helicopter H can entirely fly over the crops in the prescribed flight area. The predetermined flight path includes a plurality of waypoints WP that are set only at ends for each pass over the crops in the prescribed flight area. The predetermined flight path includes waypoints WP as a starting point SP1 and an ending point EP1 for each pass over the crops from the starting point SP1 to the ending point EP1 without a waypoint between the starting point SP1 and the ending point EP1. Once the unmanned helicopter H arrives the ending point EP1, the unmanned helicopter H automatically flies to a starting point SP2, and then automatically flies to an ending point EP2 for another pass over the crops without a waypoint between the starting point SP2 and the ending point EP2. Thus, in the illustrated embodiment, the upper processor 234 (e.g., the electronic controller) is configured to maintain the predetermined target altitude Sz over the undulating surface of the prescribed flight area (e.g., over the uneven terrain of the area). Also, in the illustrated embodiment, the upper processor 234 (e.g., the electronic controller) is further configured to control a flight (e.g., flight path) of the unmanned helicopter H that includes the starting point SP1 (SP2) and the ending point EP1 (EP2) for each pass over the crops in the prescribed flight area without a waypoint between the starting and ending points SP1 (SP2) and EP1 (EP2). The flight path can be defined manually or automatically over the ground GD in a conventional manner.

As illustrated in FIG. 13, the sensors 232 include an attitude sensor 252, a heading sensor 254, an engine revolution sensor 56, a RTK (Real Time Kinematic) GPS sensor 258, a single GPS sensor 260 and a barometer 262. The attitude sensor 252 has a three-axis gyroscope 252A, a three-axis accelerometer 252B and an attitude processor 252C. The gyroscope 252A detects rotation (angular velocity) about an X-axis, a Y-axis, and a Z-axis of the unmanned helicopter H. The accelerometer 252B detects acceleration along the XYZ axes. In the illustrated embodiment, the X-axis of the unmanned helicopter H is a longitudinal axis (or a roll axis) of the unmanned helicopter H, and extends along a longitudinal center line of the unmanned helicopter H. The Y-axis of the unmanned helicopter H is a lateral axis (or a pitch axis) of the unmanned helicopter H, and extends laterally perpendicular to the X-axis. The Z-axis of the unmanned helicopter H is a vertical axis (or a yaw axis) of the unmanned helicopter H, and extends perpendicular to the XY axes. The attitude processor 252C acquires data from the gyroscope 252A and the accelerometer 252B, and process the data to output attitude data indicative of the attitude of the unmanned helicopter H. Because the helicopter can move in any lateral direction, the yaw of the helicopter H can be aligned with the direction of movement, i.e., when the helicopter H is moving directly forward, or it can be offset from the direction of movement, e.g., when the helicopter is moving sideways or backwards.

The heading sensor 254 has a three-axis magnetometer 254A and a heading processor 254B. The magnetometer 254A detects the Earth's magnetic field along the XYZ axes. The heading processor 254B acquires data from the magnetometer 254A and the attitude sensor 252, and process the data to output heading data indicative of the heading of the unmanned helicopter H.

The RTK GPS sensor 258 receives satellite signals from satellites and correction data from the ground station via the data communication device 240 to output GPS data including the position (e.g., the latitude or north position Pn, the longitude or east position Pe and the altitude Pz relative to a reference ellipsoid) and the speed (the velocity to north Vn (north velocity Vn) and the velocity to east Ve (east velocity Ve)) of the unmanned helicopter H. The single GPS sensor 260 receives satellite signals from satellites to output GPS data including the position and the speed of the unmanned helicopter H. The barometer 262 detects the atmospheric pressure and the temperature.

The configurations of the sensors 232 are relatively conventional, and thus are described in detail herein. In the illustrated embodiment, the sensors 232 include the RTK GPS sensor 258 and the single GPS sensor 260 to detect the position and the speed of the unmanned helicopter H. However, the sensor 232 can include different types of sensors to detect the position and the speed of the unmanned helicopter H. For example, the position data can be derived from satellite-based positioning systems (global navigation satellite systems, GNSS) other than GPS, such as, GLONASS, Galileo and BeiDou, for example. Thus, in the illustrated embodiment, the unmanned helicopter H includes the RTK GPS sensor 258 and the single GPS sensor 260 (e.g., at least one sensor) configured to detect the position (e.g., the current position and the altitude) of the unmanned helicopter H and the speed of the unmanned helicopter H. The RTK GPS sensor 258 and/or the single GPS sensor 260 is an example of a GPS sensor of the present disclosure.

As illustrated in FIG. 13, the upper processor 234 includes a sensing module 270, a navigation module 272, a maneuver module 274 and a control module 276. The upper processor 234 includes a microcomputer or processor, such as a CPU (Central Processing Unit). The upper processor 234 is programmed to control the various components of the unmanned helicopter H.

The computer memory 242 stores processing results and control programs such as ones for controlling the unmanned helicopter H. For example, the computer memory 242 stores processing results or the sensing data acquired from the sensors 232. Thus, the upper processor 234 communicates with the computer memory 242 to store processing results in the computer memory 242 as well as to read the sensing data acquired from the sensors 232 and the stored processing results in the computer memory 242. It will be apparent to those skilled in the art from this disclosure that the precise structure and algorithms for the upper processor 234 can be any combination of hardware and software that will carry out the functions discussed herein. Furthermore, the upper processor 234 can also include a plurality of processors corresponding to the various modules of the upper processor 234.

The sensing module 270 includes a plurality of (four in FIG. 3) state estimation filters 270A, 270B, 270C, 270E and an environment estimation filter 270D. The state estimation filters 270A and 270B each have a GPSINS (Inertial Navigation System). The state estimation filters 270A and 270B acquire the GPS data indicative of the position and the speed of the unmanned helicopter H from the RTK GPS sensor 258 and the single GPS sensor 260, respectively. The state estimation filters 270A and 270B correct delays and/or errors in the GPS data from the RTK GPS sensor 258 and the single GPS sensor 260 using the attitude data from the attitude sensor 252 and/or the heading data from the heading sensor 254 to output the position and the speed of the unmanned helicopter H. The state estimation filter 270C acquires the attitude data from the attitude sensor 252, the atmospheric pressure and the temperature from the barometer 262, and/or the input data from the data communication device 240. The state estimation filter 270C outputs data required for operating the unmanned helicopter H when the position and the speed of the unmanned helicopter H from the RTK GPS sensor 58 and the single GPS sensor 260 cannot be used for the autonomous control.

The environment estimation filter 270D acquires control deviations (e.g., deviation of the attitude) from the control module 276 and the speed of the unmanned helicopter H derived from the state estimation filter 270A or 270B, and estimates the airspeed of the unmanned helicopter H as an environment estimation value for a navigation target calculation at the navigation module 272 or for a drift control at the maneuver module 274. The configurations of the sensing module 270 are relatively conventional, and thus the detailed description will be omitted for the sake of brevity.

The state estimation filter 270E acquires or calculates data indicative of the position, speed, and heading of the unmanned helicopter H by way of data from the local position unit 223, for example, by way of communication with the anchors 247A-247D, and depending on the principle of operation.

The navigation module 272 includes a filter selection module 272A, a navigation target calculation module 272B, a terrain following module 272C and a terrain data processing module 272D. The filter selection module 272A is configured to select one of the state estimation filters 270A, 270B, 270C, and 270E according to the accuracy of the position and the speed of the unmanned helicopter H of the state estimation filters 270A, 270B, 270C, and 270E and the input data from the data communication device 240 that indicates the selection of one of the state estimation filters 270A, 270B, 270C, and 270E. Then, the filter selection module 272A outputs the position and the speed of the unmanned helicopter H derived from the selected one of the state estimation filters 270A, 270B, 270C, and 270E together with the attitude data, the heading data and the engine speed derived from the attitude sensor 252, the heading sensor 254 and the engine revolution sensor 256, respectively, as a state estimation value.

The navigation target calculation module 272B calculates navigation target of the unmanned helicopter H based on the input data from the data communication device 240. For example, in the illustrated embodiment, the input data from the data communication device 240 includes the positions (the latitude and the longitude) of the waypoints WP that are set along the predetermined flight path FP of the unmanned helicopter H, and the predetermined target altitude Sz of the unmanned helicopter H relative to the ground GD. The navigation target calculation module 272B calculates a target position (the latitude or north position and the longitude or east position) and a target speed (the north velocity and the east velocity) of the unmanned helicopter H based on the positions of the waypoints WP, and outputs the target position and the target speed as the navigation target.

In a landing mode of operation, described in greater detail below, the location of the desired landing zone, for example, the platform 226, can be set as a waypoint WP for use by the navigation module 272B for piloting the helicopter to the vicinity of the platform 226. This navigation target calculation by the navigation target calculation module 272B is relatively conventional, and is not be described in detail.

The maneuver module 274 calculates a maneuver target of the unmanned helicopter H based on the navigation target derived from the navigation target calculation module 272B and the terrain following module 272C, the control deviations derived from the control module 276 and the environment estimation value from the environment estimation filter 270D. For example, in the illustrated embodiment, the maneuver module 274 includes a maneuver target calculation module 274A and a drift control module 274B. The maneuver target calculation module 274A generates a target attitude, a target speed, a target position and a target engine speed of the unmanned helicopter H for the unmanned helicopter H to smoothly follow or track the navigation target. The drift control module 274B corrects the maneuver target to compensate the effect of the wind based on the control deviation (e.g., deviation of the attitude) derived from the control module 276, for example. This maneuver target calculation by the maneuver module 274 is relatively conventional, and thus is not described in detail.

The control module 276 includes a control value calculation module 276A and a control signal generation module 276B. The control value calculation module 276A calculates control values of the servos 222 such that the state estimation value derived from the navigation module 272 becomes closer to the maneuver target derived from the maneuver module 274. In particular, in the illustrated embodiment, the control value calculation module 276A performs a feedback control, and serves as a PID controller, for example. The control signal generation module 276B generates the control signal applied to the servos 222 according to the control values calculated by the control value calculation module 276A. The processing of the control module 276 is relatively conventional, and thus is not described in detail.

As illustrated in FIG. 3, the sensing module 270, the navigation module 272, the maneuver module 274 and the control module 276 also output the data calculated therein to the data communication device 240 so that the ground station can monitor the status of the unmanned helicopter H.

Figure 14:
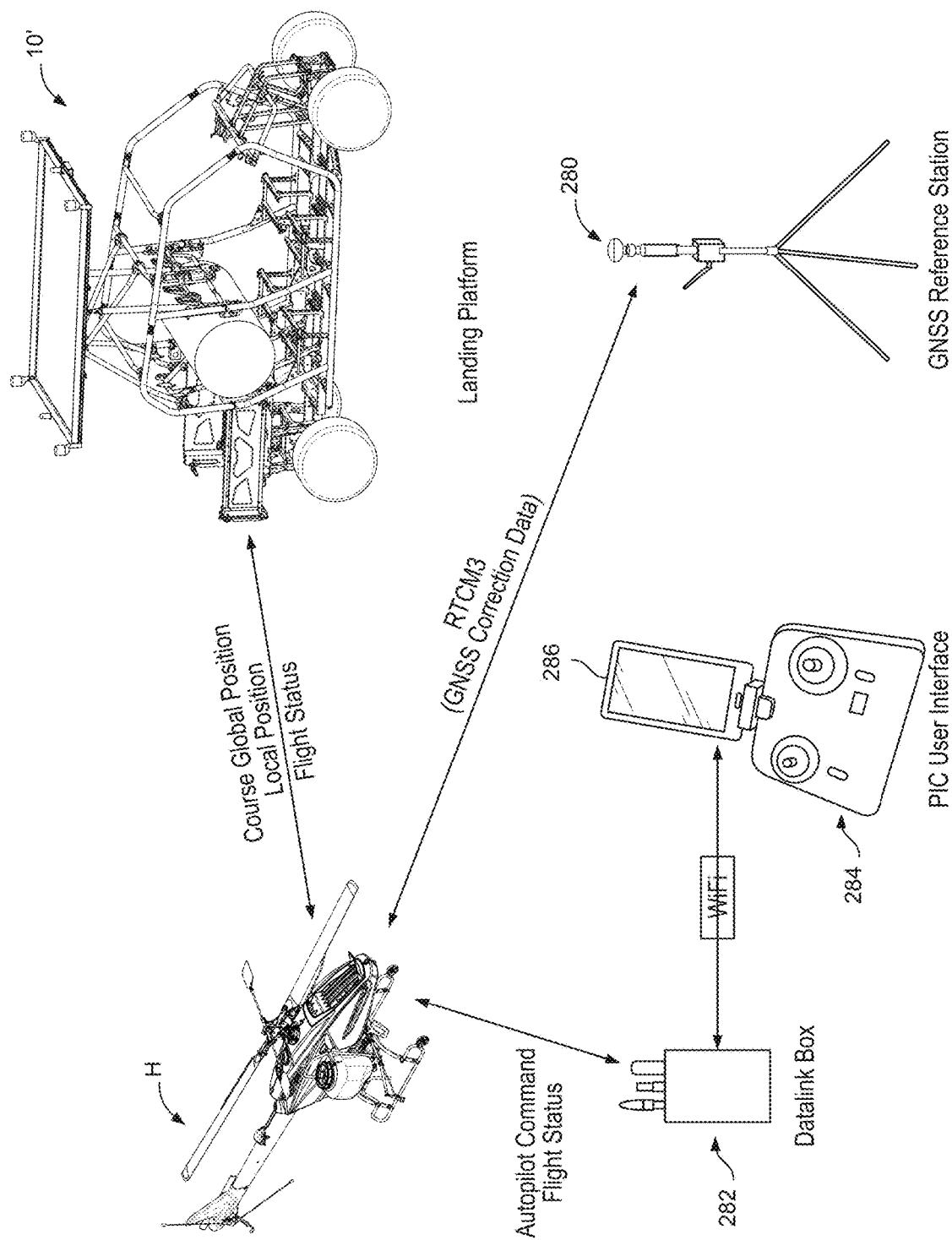
FIG. 14 is a schematic diagram illustrating an embodiment of a wireless communication scheme during operation of the unmanned helicopter and the landing platform.

With reference to FIG. 14, in some embodiments, the flight control system 230 of the unmanned helicopter H, during operation, receives GNSS correction data from a GNSS reference station 280 which can be placed in vicinity, or e.g., within wireless data communication range, in an area in which the unmanned helicopter H is intended to be operated, in particular, in a terrain following mode. Additionally, a data link device 292 can be used to ensure consistent and reliable data communications between unmanned helicopter and a user. For example, a user might use a user interface 284 including a remote control module that allows for manual operations as well as switching to automated operations. In the illustrated embodiment, the user interface 284 includes a tablet 286 mounted to the handheld remote control unit and in wireless communication with the data link box 282, for example, by way of Bluetooth or 80211 data communication protocols. Additionally, the controller 82 of the aircraft platform 26 can communicate with the flight control system 230 directly and/or through the data link box 282.

Figure 15:
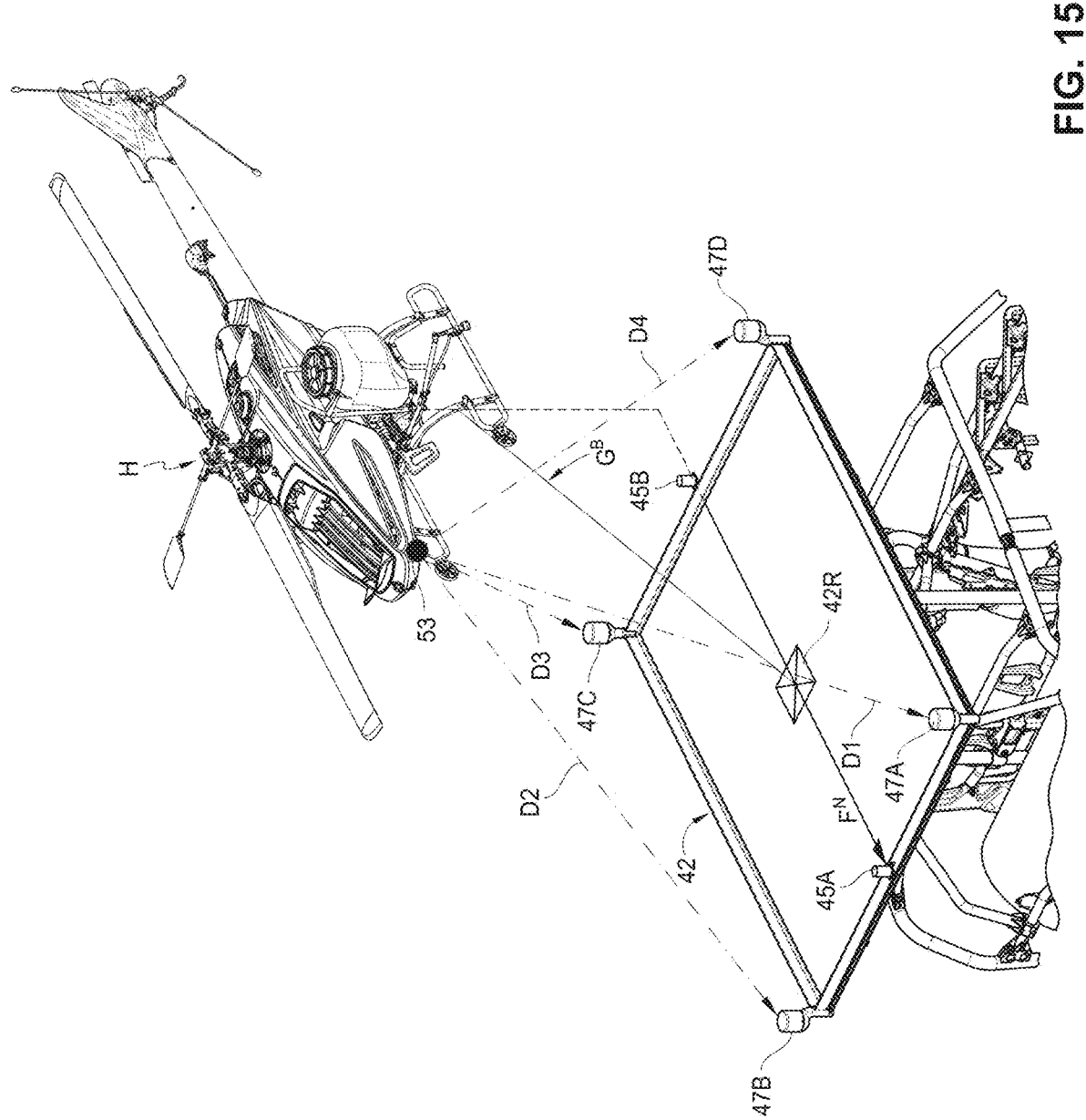
FIG. 15 is a perspective view of an unmanned helicopter during execution of an automated landing method with a local navigation system according to an embodiment.

With reference to FIG. 15, during a landing mode operation, the flight control system 230 of the unmanned helicopter H can communicate with the general position module 45 and the local position module 47 (FIG. 6A) for determining the appropriate waypoints and position data for performing a desired landing in a desired orientation of the unmanned helicopter H on the aircraft platform 26. For example, when the flight control system 230 is initially switched to a landing mode, the controller 82 (FIG. 6A) of the aircraft platform 26 can collect and transmit general position data, such as GPS data (longitude, latitude, and altitude) to flight control system 230 by way of the data communication device 240. The navigation module 272 can use the received general position data to set that location of the aircraft platform 26 as a waypoint. After traveling toward the aircraft platform 26, the flight control system 230 can be configured to switch to a landing mode operation, for example, when the unmanned aircraft H reaches a position within a range of expected reliable operation of the local position module 47 with the local position sensor 53. For example, such a range threshold can be a few meters, ten meters, 20 meters, etc. Optionally, the navigation module 272 can preset the landing waypoint WP at a position elevated to a predetermined distance above the aircraft platform 26, for example, a few meters, three meters, five meters, ten meters, etc. and to remain in this location hovering, by entering a hovering mode, until communication with the local position module 47 has been established.

After communication with the local position module 47 has been established, the flight control system 230 can enter a local navigation landing mode.

In a local navigation landing mode, the flight control system 230 can initiate communication between the local position sensor 53 of the unmanned helicopter H and the local position devices 47A-47D. Based on the principle of operation used, the local position sensor 53 and the local position devices 47A-47D, can be used to determine the distances between the unmanned helicopter H and each of the local position devices 47A-47D, as D1, D2, D3, D4, respectively.

Where the local position sensor 53 and the local position module 47 are configured to operate under the time of flight, time delay of arrival, or phase difference of arrival, the results will provide distances D1-D4. Thus, regardless of the principal of operation, the position of the unmanned helicopter, and in particular, the position of the device 53 relative to a fixed point on the aircraft platform 26, such as the reference point 42R, can be calculated as described above with reference to FIG. 5-6C. For example, the controller 230 (FIG. 13) can communicate with the controller 82 (FIG. 6A) to determine the landing vector $G^B$, which the controller 230 can use to move the unmanned helicopter H in the directions necessary to move the reference point between the skiis 224 into contact with the refence point 42R on the landing pad 42. Optionally, the controller 230 can also control the unmanned helicopter H to maneuver into the desired heading ($\Psi$), for example, by maneuvering the unmanned helicopter such that its heading ($\Psi$) is the same as the heading ($\Psi$) of the landing pad 42, determined as described above with reference to FIG. 6C.

Thus, the determination of the location of the reference point 42R can be provided to the navigation module as a final landing waypoint WP and the current location of the unmanned helicopter H can be associated with the position of the device 53 or another fixed point relative thereto, for purposes of determining a distance between the unmanned helicopter H and its final landing position. As noted above, the vector $G^B$ can be used for such a waypoint definition. The navigation module can provide that information to the maneuver module 274 for executing landing operation. For example, an operation in which the maneuver module 274 generates a smooth subordinate target (maneuver target) for tracking a rough superordinate target (navigation target) generated by the navigation module 272. Accordingly, the control module 276 can control the servos 222 to follow the smooth subordinate target, bringing the unmanned helicopter H to a final landing position on the upper surface of the takeoff and landing pad 42, and optionally, with a vehicle heading ($\Psi$) that is the same, substantially the same as, or at a predetermined relative angular offset from the heading ($\Psi$) of the landing pad 42.

Figure 16:
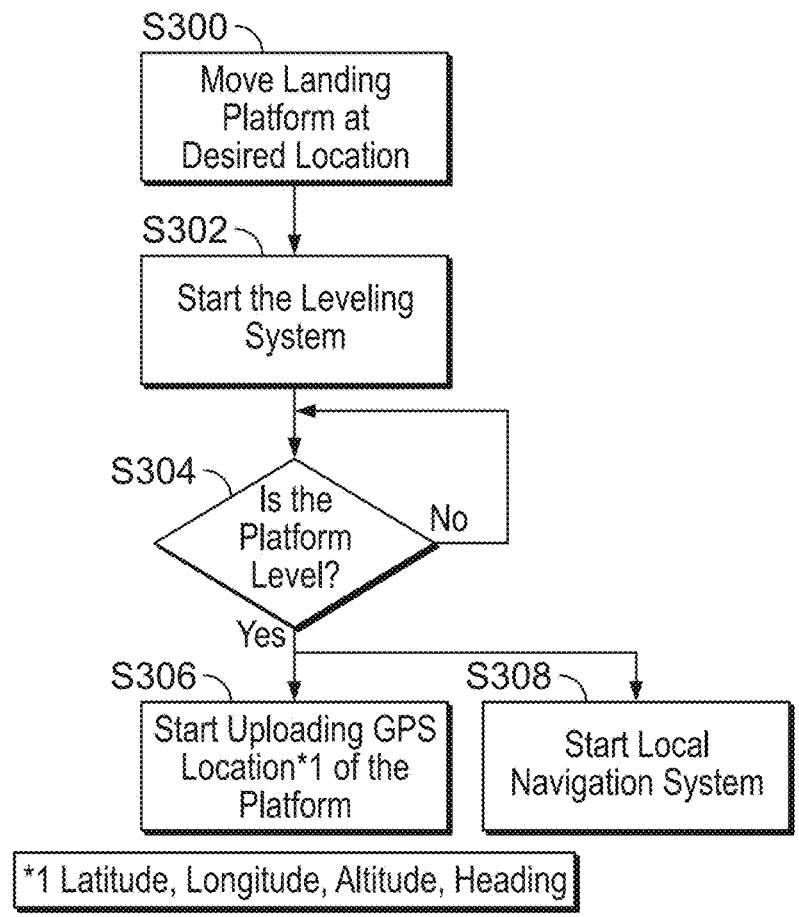
FIG. 16 is a flow chart of an embodiment of a landing platform leveling and local navigation commencement method.
Figure 17:
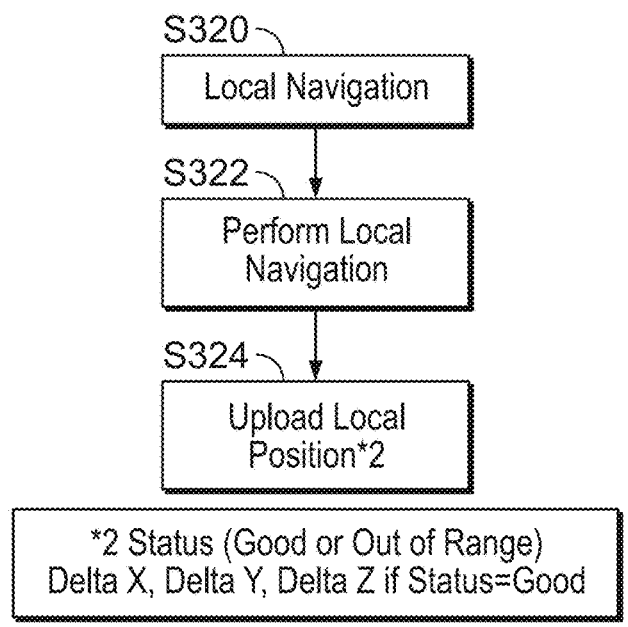
FIG. 17 is a flow chart of an embodiment of a landing platform local navigation operation method.

With reference to FIG. 16, the method of operation of a landing mode can include the following operations. For example, the flight control system 230 can be switched into a landing mode, at operation S300, either by manual instruction by a user, or the occurrence of predetermined events, such as, for example, but without limitation, if a chemical level is low, a fuel level is low, a program has been finished, a communication link has been lost, or other conditions. After the operation S300, the landing control method of operation can move to operation S302.

In the operation S302, the leveling system of the aircraft platform 26 can be initiated. The leveling operation of operation S302 can proceed according to the operations described above with reference to FIGS. 7 and 8. After the operation S302, the landing mode operation can move to decision operation S304.

In the decision operation S304, it is determined whether or not the platform is level. For example, the controller 82 can determine whether or not the upper surface of the takeoff and landing pad 42 as level. If it is not, the operation returns and continues to perform the leveling operation. This is reflected in the flow diagram of FIG. 8. If it is determined in the decision operation of S304, that the platform is level, the operation moves on to both operations S306 and S308.

In the operation S306, the controller 82 collects and transmits general location information from the general location module 45, and transmits the general location information to the unmanned helicopter, by way of the data communication device 49 (FIG. 6). For example, in operation, the general location module 45 can collect position data (e.g., latitude, longitude and altitude) from each of the general position devices 45A, 45B, and calculate a heading based on the relative positions indicated by the two general position devices 45A and 45B. In other embodiments, different data can be used to produce an indication of the general position of the landing platform 26, for example, based on a single GPS position data along with a compass heading data. With some embodiments, the general position module 45 is configured to output a latitude, longitude, altitude of the aircraft platform 26 as well as a "heading." In some embodiments, the heading can be considered the direction defined by a line extending from the rear edge of the takeoff and landing pad 42, for example, the direction defined by a line extending from the general position device 45A to the general position device 45B (FIG. 5). Optionally, vector $F^N$, and/or the heading ($\Psi$) described above with reference FIGS. 6B and 6C can serve as the heading of the landing pad 42.

The operation S308 can include activation of the local position module 47. For example, depending on the principle of operation for which the module 47 is configured, the controller 82 can power on the device 47A-47D. Under a time of flight principle of operation, the devices 47A-47D, operating as "anchors", each independently communicate with a local position local position sensor 53, operating as a "tag". Optionally, under the time delay of arrival principle of operation, the devices 47A-47D receive an initial blink signal from the local position sensor 53, and the difference in the time of arrival of the blink signal at each of the different devices 47A-47D is used to calculate the distances D1-D4, respectively. Under these principles of operation, the controller 82 and/or another separate module (not shown) can be used to control anchors 47A-47D, for example, maintaining synchronization of the anchors 47A-47D, receiving time stamps of the signal received at each of the anchors 47A-47D using the time stamps for determining the distances D1-D4, according to known techniques. The resulting data can then be transmitted back to the flight control system 230 by the data communication device 49. Similar communications can be used for operation of the phase difference of arrival principle of operation.

As noted above, the unmanned helicopter H can continue to operate in a terrain following mode as it travels towards the landing waypoint established in operation 306, Alternatively, other modes of flight can also be used for moving the unmanned helicopter H to the aircraft platform 26.

After the unmanned helicopter H comes within a predetermined range of the waypoint, the flight control system 230 can change to a local navigation landing mode. For example, in some embodiments, the local navigation landing mode can begin at operation S320, when the unmanned helicopter H reaches a threshold range of a few meters, five meters, ten meters, 20 meters, or other range, of the landing waypoint. After initiation of the local navigation landing mode of operation S320, the operation can move to operation S322.

In the operation S322, the flight control system 230 can execute a local navigation operation. For example, the local position sensor 53 can be activated to communicate with the anchors 47A-47D to obtain a distance between the unmanned helicopter H and its final landing position. In some embodiments, some of the data for this determination comes from the anchors 47A-47D and/or from the controller 82 by way of the data communication device 49. In some embodiments, the controller 230 determines the landing vector $G^B$.

Where the local position data comes from the controller 82, the operation can include the optional operation S324 for determining whether the position data is out of range or appears to be within range. Thus, in some embodiments, in the operation S324, the controller 82 can send an "out of range" signal to the unmanned helicopter which the flight control system 230 can use as an indication to return to a hover mode, for example, at a predetermined altitude above the platform 26. If, however, in operation block 324 it is determined that the position data is within range, the controller 82 can output location data in the form of a coordinate distance between the unmanned helicopter H and the upper surface of the takeoff and landing pad 42 in the form of $\Delta X$, $\Delta Y$, $\Delta Z$, along the vector $G^B$. Additionally, optionally, the controller 82 can also output orientation data of the landing pad 42 to the flight control system 230. For example, as described above with reference to FIGS. 6B and 6C, the controller 82 can be configured to determine an heading ($\Psi$) of the landing pad 42, using the general position devices 45A, 45B or other devices. The controller can output to the flight controller 230, attitude data indicative of the detected heading ($\Psi$).

Figure 18:
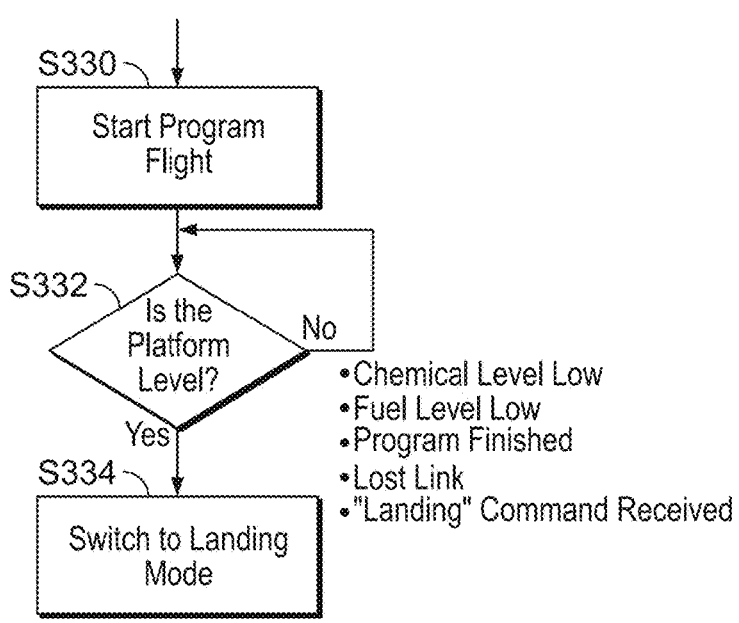
FIG. 18 is a flow chart of an embodiment of an unmanned aircraft auto landing mode commencement method.

FIG. 18 illustrates an optional operation for triggering landing mode. For example, the unmanned helicopter H can be operating under a pre-programmed flight in operation S330. The landing mode operation trigger operation can include a decision operation S332.

In the decision operation S332, it can be determined whether or not the unmanned helicopter H should land. For example, in decision operation S332, it can be determined whether a chemical level is low, a fuel level is low, a program has been finished, a communication link has been lost, or a user has issued a landing command. If it is determined that none of the landing indications have been determined, then the operation can return and repeat operation S332. On the other hand, if it is determined that the unmanned helicopter H should land, the landing mode trigger operation can move to operation block S334 and switch the flight control system 230 to a landing mode.

Figure 19:
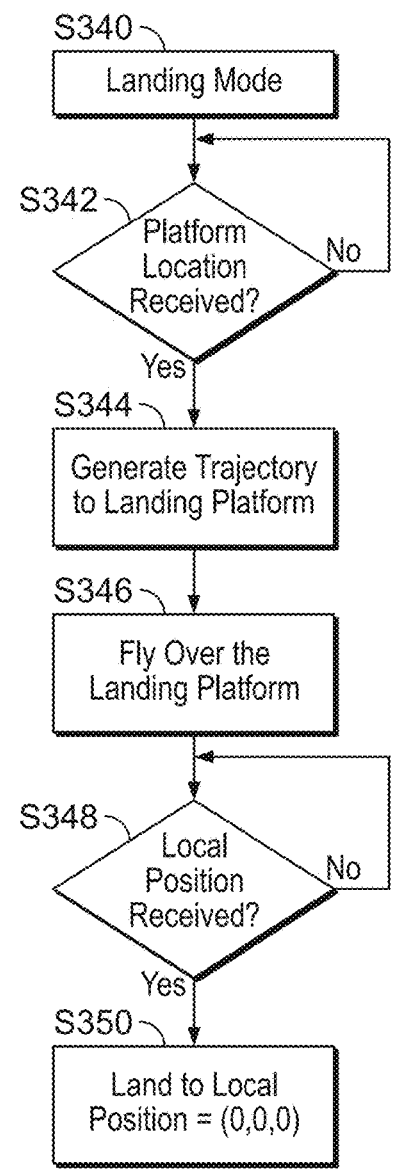
FIG. 19 is a flow chart of an embodiment of an unmanned aircraft auto landing method.

FIG. 19 illustrates an optional method of operations for a landing mode. The landing mode can include operation S340, which can be triggered by the landing mode trigger operation of FIG. 18. After the landing mode has been triggered in operation S340, the landing mode operation can move to decision operation S342.

In decision operation S342, it can be determined if the location of the aircraft platform 26 has been received by the flight controller 230. For example, the flight controller 230 can determine if it has received an indication of the general location, for example, by way of the general location module 45 (FIG. 6) indicating the location of the aircraft landing pad 26. If it is determined, in the decision operation S342, that the location of the aircraft landing platform 26 has not been received, the operation can return and repeat decision operation 342. On the other hand, if it is determined that the location of the aircraft platform 26 has been received, the landing mode operation can move to operation block S344.

In the operation block S344, a trajectory to the platform 26 can be generated. For example, the flight controller 230 can receive the location of the aircraft platform 26 from the general position module 45 which can be transmitted to the unmanned helicopter H through the data communication device 49 directly to the data communication device 240 and/or by way of the data link box 282. The position of the aircraft platform 26 can be used by the navigation module 272 as a landing waypoint WPL thus, the navigation module can generate a trajectory using the landing waypoint WPL and optionally use a terrain following mode by operation of the terrain following module 272C and terrain data processing module 272D, or another flight mode. Optionally, the navigation module 272 can set the landing waypoint WPL as a position elevated above the platform 26, by a few meters three meters, five meters, ten meters, or higher. After the trajectory to the aircraft platform 26 has been determined, the landing operation can move to operation block S346.

In operation S346, flight control system 230 controls the unmanned helicopter H to fly to the landing waypoint WPL which is a position over the landing platform 26. In some embodiments, the unmanned helicopter can enter hovering mode to maintain its position over the aircraft platform 26 until subsequent operations can be executed. After the operation S346, the landing mode operation can move on to decision operation S348.

In the decision operation S348, it can be determined if the unmanned helicopter has received an indication of the local position of the takeoff and landing pad 42. For example, the flight control system S230 can determine whether it has received a local position of the takeoff and landing pad 42, for example, the location of the reference point 42R, data indicative of at least three of the distances D1-D4, and optionally, attitude data indicative of the heading ($\Psi$) of the landing pad 42, by way of the local position module 47, described above, which can be transmitted to the flight control system by the data communication device 49. If it is determined, in decision operation S348, that the local position has not been received, the operation can return and repeat decision operation S348. On the other hand, if it is determined in decision operation S348 that the local position of the takeoff and landing pad 42 has been received, the landing mode operation can proceed to operation S350.

In the operation S350, the navigation module 272 and maneuver module 274 can be used to control the unmanned helicopter to land in a predetermined location and orientation on the upper surface of the takeoff and landing pad 42. For example, the navigation module can set the final landing waypoint $WP_{LF}$ as the reference point 42R (FIG. 5). Additionally, the data from the local position sensor 53 and/or the anchors 47A-47D can be used to determine a distance and heading between the reference point 42R and a fixed point in space relative to the unmanned helicopter H which would be coincident with the reference point 42R when the unmanned helicopter H is in the desired final landing position. This distance can be expressed as the vector $G^B$, as described above. Thus, the operation S350 can continue until the difference between the position of reference point 42R and the reference point relative to the unmanned helicopter H is $\Delta X=0$, $\Delta Y=0$, $\Delta Z=0$. Optionally, operation S350 can also include controlling the heading ($\Psi$) of the unmanned helicopter H based on the heading ($\Psi$) of the landing pad 42. For example, in some embodiments, the flight controller 230 adjusts the heading ($\Psi$) of the unmanned helicopter H, for example, by operation of the servo 222D (FIG. 10), to have a predetermined relative angular relationship to the heading ($\Psi$) of the landing pad 42. Any predetermined relative angular relationship can be used. A desired angular relationship or offset may be based on the placement of the general position devices 45A, 45B and the desired landing attitude of the unmanned helicopter H, for example, which might be based on a desired orientation for transportation, servicing and/or refilling the unmanned helicopter H, or other considerations. In some embodiments, the predetermined relative angular relationship might be parallel, transverse, perpendicular, or other orientations.

In some modes, the maneuver module 274 can be used to generate a maneuver target based on the navigation target $WP_{LF}$ to smoothly track the navigation target. In other words, the maneuver module 274 can realize a smooth behavior of the unmanned helicopter H by generating a smooth subordinate target (maneuver target) for tracking a rough superordinate target (navigation target) generated by the navigation module 272, and the control module 276 can control the servos 222 to follow the smooth subordinate target. Thus, basically, the unmanned helicopter H follows the superordinate target with delay, to smoothly arrive at the desired final landing position and orientation.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise. These terms, as utilized to describe the present inventions should be interpreted relative to a utility task vehicle on a horizontal surface.

While only selected embodiments have been chosen to illustrate the present inventions, it is apparent to those skilled in the art from this disclosure that various changes and modifications can be made herein without departing from the scope of the inventions. The structures and functions of any one embodiment can be adopted in any of the other embodiments. It is not necessary for all disclosed advantages to be present in a particular embodiment at the same time. Every feature which is unique from the prior art, alone or in combination with other features, also should be considered a separate description of further inventions, including the structural and/or functional concepts embodied by such feature(s). Thus, the foregoing descriptions of the embodiments according to the present inventions are provided for illustration only, and not for the purpose of limiting the inventions as defined by the appended claims and their equivalents.

What is claimed is:

1. An aircraft takeoff and landing system, comprising:
   a landing platform, comprising:
   a takeoff and landing pad having an upper surface configured for supporting an unmanned aircraft during before takeoff and after landing of the unmanned aircraft;
   a first general position detection module configured to detect a first general position of the takeoff and landing pad and to output the detected first general position of the takeoff and landing pad to the unmanned aircraft;
   a first local relative position detection module configured to detect a plurality of distances relative to a reference point associated with the unmanned aircraft, wherein each individual distance of the plurality of distances corresponds to one of a plurality of local relative position detection devices;
   an aircraft configured to takeoff and land from the takeoff and landing pad, the aircraft comprising:
   a propulsion system configured to propel the aircraft in powered flight;
   a second general position detection module configured to detect a second general position of the unmanned aircraft during flight;
   a second local relative position detection module configured to communicate with the first local relative position detection module and to detect a relative position between the aircraft and the takeoff and landing pad based on the detected plurality of distances;
   a flight controller connected with the propulsion system and the second local relative position detection module, and configured to control the propulsion system to automatically land the aircraft at a reference point on the takeoff and landing pad based on the communication between the first and second local relative position detection modules; and
   a plurality of linear actuators coupled to the upper surface, wherein the plurality of linear actuators are independently actuated for adjusting a pitch angle and a roll angle of the upper surface and for leveling the landing platform to maintain a horizontal orientation of the upper surface;
   wherein the aircraft takeoff and landing system initiates a landing mode after the landing platform is level, wherein the landing mode is initiated in response to a confirmation that the landing platform is level.

2. The aircraft takeoff and landing system according to claim 1, wherein the first local relative position detection module comprises a plurality of anchors mounted to the takeoff and landing pad at spaced apart locations, and wherein the second local relative position detection module comprises a tag mounted to the aircraft and configured to transmit blink signals to the plurality of anchors.

3. The aircraft takeoff and landing system according to claim 1, wherein the first and second local relative position detection modules are configured to operate under time of flight, time delay of arrival, or phase delay of arrival principles of operation.

4. The aircraft takeoff and landing system according to claim 1, wherein the first general position comprises global position coordinates of the takeoff and landing pad, the first general position detection module comprising at least a first GPS device configured to detect a first characteristic of a global position of the takeoff and landing pad, and a second general position sensor configured to detect a second characteristic of the global position of the takeoff and landing pad, wherein the flight controller is further configured to control the propulsion system to land the aircraft in a predetermined orientation on the takeoff and landing pad based on the first and second characteristics.

5. The aircraft takeoff and landing system according to claim 1, wherein the first local relative position detection module is operable when the aircraft is within a range of airspace shorter than a maximum range of the first general position detection module, and with a higher precision than that which is possible with the first general position detection module.

6. The aircraft takeoff and landing system according to claim 1, wherein the flight controller is further configured to receive a global position of the takeoff and landing pad from the first general position detection module and to control the propulsion system to automatically move the aircraft to a vicinity of the first general position of the takeoff and landing pad.

7. The aircraft takeoff and landing system according to claim 1, wherein the first local relative position detection module comprises a plurality of local position detection devices mounted to the takeoff and landing pad and being configured to output data indicative of a local position of the aircraft relative to a predetermined location of the takeoff and landing pad.

8. The aircraft takeoff and landing system according to claim 1 additionally comprising a controller connected with the first general position detection module, and the first local relative position detection module.

9. The aircraft takeoff and landing system according to claim 1 wherein the first general position detection module is configured to detect a pad attitude of the takeoff and landing pad and output attitude data indicative of the pad attitude of the takeoff and landing pad, and wherein the flight controller is configured to receive the attitude data and to land the unmanned aircraft with a landing attitude oriented with a predetermined angular relationship relative to the pad attitude.

10. The aircraft takeoff and landing system according to claim 1, wherein the second local relative position detection module is configured to determine the relative position between the aircraft and a predetermined location on the takeoff and landing pad based on data indicative of the local position of the aircraft output from the first local relative position detection module.

11. An unmanned aircraft configured for takeoff and landing on a landing platform, the unmanned aircraft comprising:
a propulsion system configured to propel the unmanned aircraft in powered flight;
a general position detection module configured to detect and output general position data indicative of a general position of the unmanned aircraft during flight, the general position data comprising global position coordinate data;
a local relative position detection module configured to communicate with a plurality of local relative position detection devices mounted on a mobile takeoff and landing pad and configured to detect a plurality of distances between a reference point associated with the unmanned aircraft and the plurality of local relative position detection devices, wherein the local relative position detection module determines a relative position between the unmanned aircraft and the landing platform based on the plurality of distances; and
a flight controller connected with the propulsion system, the general position detection module, and the local relative position detection module, the flight controller configured to control the propulsion system to propel the unmanned aircraft to a vicinity of the global position of the aircraft takeoff and landing platform, to control the local relative position detection module to determine the relative position between the unmanned aircraft and a landing pad, and then to control the propulsion system to automatically land the unmanned aircraft at a predetermined position on the takeoff and landing pad based on the output from the local relative position detection module;
wherein:
the flight controller of the unmanned aircraft is configured to cause the unmanned aircraft to land on a horizontally oriented landing platform and wherein the horizontally oriented landing platform includes a plurality of linear actuators configured to adjust a pitch angle and a roll angle of the landing platform to level the landing pad to maintain a horizontal orientation of an upper surface for receiving the unmanned aircraft; and
the unmanned aircraft initiates a landing mode after the horizontally oriented landing platform is level, wherein the landing mode is initiated in response to a confirmation that the landing platform is level.

12. The unmanned aircraft according to claim 11, wherein the local relative position detection module comprises a tag mounted to the unmanned aircraft and configured to transmit blink signals to a plurality of anchors mounted to the landing pad at spaced apart locations.

13. The unmanned aircraft according to claim 11, wherein the local relative position detection module is configured to operate under time of flight, time delay of arrival, or phase delay of arrival principles of operation.

14. The unmanned aircraft according to claim 11, wherein the local relative position detection module is further configured to output local position data indicative of the plurality of distances, wherein the local relative position detection module comprises a higher precision and accuracy that that of the general position detection module.

15. The unmanned aircraft according to claim 11, wherein the flight controller is configured receive attitude data indicative of a pad attitude of the mobile takeoff and landing pad, and wherein the flight controller is configured to automatically land the unmanned aircraft with a landing attitude oriented with a predetermined angular relationship relative to the pad attitude.

16. An unmanned aircraft takeoff and landing system, comprising:
a landing platform comprising:
a takeoff and landing pad having an upper surface configured for supporting an unmanned aircraft during before takeoff and after landing of the unmanned aircraft;
a general position detection module configured to detect a general position and an orientation of the takeoff and landing pad, wherein the general position detection module is further configured to output the general position and the orientation of the takeoff and landing pad to the unmanned aircraft;
a local relative position detection module configured to detect a plurality of distances to the unmanned aircraft relative to a reference point associated with the unmanned aircraft, the local relative position detection module comprising a plurality of local position detection devices mounted to the takeoff and landing pad, wherein each of the plurality of local position detection devices is configured to output a corresponding distance between the reference point associated with the unmanned aircraft and the corresponding local position detection device of the takeoff and landing pad;
a controller connected with the general position detection module, and the local relative position detection module; and
a plurality of linear actuators coupled to the upper surface, wherein the plurality of linear actuators are independently actuated for adjusting a pitch angle and a roll angle of the upper surface for leveling the landing platform to maintain a horizontal orientation of the upper surface;
wherein the unmanned aircraft takeoff and landing system initiates a landing mode after the takeoff and landing pad is level, wherein the landing mode is initiated in response to a confirmation that the landing platform is level.

17. The unmanned aircraft takeoff and landing system according to claim 16, wherein the local relative position detection module comprises a plurality of anchors mounted to the takeoff and landing pad at spaced apart locations and configured to communicate with a tag, mounted to the unmanned aircraft, configured to transmit blink signals to the plurality of anchors.

18. The unmanned aircraft takeoff and landing system according to claim 16, wherein the local relative position detection module is configured to operate under time of flight, time delay of arrival, or phase delay of arrival principles of operation.

19. The unmanned aircraft takeoff and landing system according to claim 16, wherein the general position of the takeoff and landing pad comprises global position coordinates of the takeoff and landing pad, the general position detection module comprising at least a first GPS device configured to detect a first characteristic of a global position of the takeoff and landing pad and at least a second general position sensor configured to detect a second characteristic of the global position of the takeoff and landing pad.

20. The unmanned aircraft takeoff and landing system according to claim 16, wherein the local relative position detection module is operable when the unmanned aircraft is within a range of airspace shorter than a maximum range of the general position detection module, and with a higher precision than that which is possible with the general position detection module.

21. The aircraft takeoff and landing system according to claim 1, further comprising a vehicle, wherein the landing platform is coupled to the vehicle and the plurality of linear actuators are oriented vertically perpendicular relative to a longitudinal axis of the vehicle.

22. The aircraft takeoff and landing system according to claim 1, further comprising a non-adjustable center support leg coupled to the upper surface, wherein the plurality of linear actuators are a right support leg and a left support leg, wherein the non-adjustable center support leg, the right support leg, and the left support leg are arranged in a triangle.

23. The aircraft takeoff and landing system according to claim 22, wherein the non-adjustable center support leg is coupled to a first edge of the landing platform along a longitudinal axis of the landing platform, and wherein the right support leg and the left support leg are coupled to a second edge of the landing platform opposite the first edge laterally displaced from the longitudinal axis of the landing platform.

24. The aircraft takeoff and landing system according to claim 1, wherein the landing platform transmits the first general position of the takeoff and landing pad to the aircraft after the takeoff and landing pad is level along the horizontal orientation.

25. The aircraft takeoff and landing system according to claim 1, wherein the landing mode comprises:
generating a trajectory to the landing platform;
flying the unmanned aircraft to a position over the landing platform; and
landing the unmanned aircraft on the landing platform.

* * * * *